United States Patent Office 3,196,157
Patented July 20, 1965

3,196,157
BENZIMIDAZOLINYL PIPERIDINES
Paul Adriaan Jan Janssen, Vosselaar, near Turnhout, Belgium, assignor to Research Laboratorium Dr. C. Janssen N.V., a corporation of Belgium
No Drawing. Filed June 11, 1963, Ser. No. 286,911
18 Claims. (Cl. 260—294)

This application is a continuation-in-part of co-pending application Serial No. 202,056, filed on June 13, 1962, and subsequently abandoned.

This invention relates to a new series of organic compounds. More particularly, it concerns certain benzimidazolinyl piperidines, the corresponding 1,2,3,6-tetrahydropyridines and their therapeutically active nontoxic acid addition salts.

The structure of these compounds may be represented by the following formula:

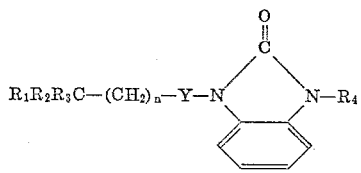

where $n$ is an integer from 2 to 5; $R_1$ stands for hydrogen, hydroxy, cyano, carbamoyl and lower-alkyl-carbonyl; $R_2$ stands for aryl and $R_3$ stands for aryl or arylmethylene; $R_4$ stands for hydrogen, lower alkyl, lower-alkyl-carbonyl, lower-alkoxy-lower-alkyl, hydroxy-lower-alkyl, lower-alkoxy-carbonyl-lower-alkyl, lower-alkyl-carbonyl-lower-alkyl, cyano-lower-alkyl, and halo-lower-alkyl; Y is a member selected from the group consisting of

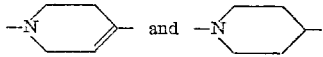

the nitrogen of the ring beng attached to the $$R_1R_2R_3C\!-\!(CH_2)_n\!-\!$$

moiety.

In the above definition aryl is phenyl, halophenyl, such as chlorophenyl and fluorophenyl, lower alkylphenyl, such as methylphenyl, trifluoromethyl-phenyl, lower-alkoxyphenyl, such as methoxyphenyl and 2-thienyl; the lower alkyl and lower alkoxy groups having in each instance from 1 to 5 carbon atoms.

The compounds of this invention may be converted to their therapeutically useful acid addition salts by reaction with an appropriate acid as, for example, an inorgnaic acid such as a hydrohalic acid, i.e., hydrochloric, hydrobromic or hydriodic acid; sulfuric, nitric or thiocyanic acid; a phosphoric acid; an organic acid such as acetic, propionic, glycolic, lactic, pyruvic, oxalic, malonic, succinic, maleic, fumaric, malic, tartaric, citric, benzoic, cinnamic, mandelic, methanesulfonic, ethanesulfonic, hydroxyethanesulfonic, p-toluenesulfonic, salicylic, p-aminosalicylic, 2-phenoxy-benzoic or 2-acetoxy-benzoic acid.

The compounds of this invention are central nervous system depressants. The compounds have been shown to possess one or more of the following pharmacological properties: neuroleptic activity, coronary vasodilating activity, analgesic activity, mydriatic activity and anti-"apomorphine-induced emetic" acitvity.

Among the preferred and more notably active compounds of this invention are the following. Long acting, potent morphine-like analgesic activity is shown when $n$ in the above general formula is 2; $R_1$ is hydrogen, hydroxy, cyano, carbamoyl and lower-alkyl-carbonyl; and where $R_2$ and $R_3$ both are aryl, but preferably, where $R_2$ and $R_3$ are phenyl. This analgesic activity is illustrated by the hot plate test of Eddy et al. (J. Pharmacol., 107, 385 (1953), and 110, 135 (1954), mydriatic activity in mice, and observation of a positive Straub phenomenon. Mice injected subcutaneously with these compounds respond to the hot plate test at doses from about 0.03 mg./kg. upward. Mydriatic activity was evidenced in the animals at doses of from about 0.06 mg./kg. upward.

Potent neuroleptic activity of extremely long duration is observed in compounds where $n$ is an integer from 3 upward, but preferably, $n=3$, and where $R_1$ is hydrogen or hydroxy and where $R_2$ is a halophenyl, preferably fluorophenyl and $R_3$ is an aryl, preferably fluorophenyl or phenyl.

Furthermore potent coronary vasodilating activity is observed in compounds where $n$ is an integer from 3 upward, but preferably $n$ is 3 or 4, and where $R_1$ is hydrogen or hydroxy and where $R_2$ and $R_3$ are selected from the group consisting of phenyl and lower-alkyl-phenyl, preferably, methyl-phenyl.

The compounds of this invention are obtained by reacting a compound of the formula $$R_1R_2R_3C\!-\!(CH_2)_n\!-\!Hal$$

where Hal stands for bromo or chloro, with the appropriate 4-(2-oxo-1-benzimidazolinyl)-piperidine or tetrahydro-pyridine respectively under reflux conditions, preferably in the presence of a halogen acid acceptor, such as sodium carbonate, trialkylamines or tertiary heterocyclic amines, to bind the halogen acid that is liberated during the course of the reaction.

By refluxing a 1-[$R_1R_2R_3C\!-\!(CH_2)_n\!-\!$]-4-(2-oxo-1-benzimidazolinyl)-piperidine, where $R_1$ is cyano, in the presence of a Grignard reagent and a suitable organic solvent, such as diethylether, the corresponding compound is obtained where $R_1$ is lower-alkyl-carbonyl.

Conversion of this cyano group $R_1$ to the carboxamide group occurs by heating the benzimidazolone with a dilute solution of an inorganic acid, such as hydrochloric acid or sulfuric acid, at an elevated temperature for several hours, e.g., about three to eight hours, then cooling the mixture to stop the reaction.

Introduction of a hydroxymethyl group at the 3-position of the benzimidazolone moiety is effected by treatment of the corresponding unsubstituted benzimidazolone with the appropriate aldehyde under reflux conditions in the presence of a water-organic solvent. The hydroxyethyl group is introduced by using 1,3-dioxa-2-oxo-cyclopentane under the same reaction conditions.

Acylation of the compounds where $R_4$ is hydrogen, i.e., the 3-position on the benzimidazolinyl function is unsubstituted, and where $R_1$ is hydrogen, cyano, carbamoyl or lower-alkyl-carbonyl, is accomplished by heating such compound with an acylating agent, such as an anhydride of low molecular weight under reflux conditions in the presence of a suitable organic hydrocarbon solvent, such as benzene or toluene. In those cases where $R_1$ is hydroxy, a selective acylation at the 3-position of the benzimidazolinone moiety may be accomplished by means of an equimolar amount of a lower-alkyl-carbonyl halide and an equimolar amount of a suitable basic condensing agent, such as sodium amide or sodium alkoxide, in the presence of a suitable inert organic hydrocarbon solvent, such as benzene or toluene.

The intermediate secondary amines, i.e., the 3-substituted or unsubstituted 4-(2-oxo-1-benzimidazolinyl)-piperidines are prepared, for example, by reducing the corresponding 1-benzyl-substituted compound. Preferential debenzylation gives a benzimidazolinyl product which is unsubstituted in the 3-position. If the 1,2,3,6-tetrahydro-pyridine ring is involved, the compound may be converted to the corresponding piperidine by further hydrogenation.

Introduction of an alkyl group in the 3-position of, for example, 1-benzyl-4-(2-oxo-1-benzimidazolinyl)-1,2,3,6- tetrahydro-pyridine is accomplished by treatment with the appropriate alkylating agent, such as an alkyl halide or phenyltrimethylammoniumiodide, in the presence of a strong base, such as sodium amide, under reflux conditions in the presence of a suitable organic inert solvent, such as benzene or toluene.

The cyano alkyl group is introduced into the 3-position of the benzimidazolone moiety by treatment with an unsaturated nitrile, e.g. acrylonitrile, in an organic solvent in the presence of a strong base, such as sodium alkoxide or a quaternary ammonium hydroxide, e.g., trimethylbenzylammonium hydroxide or triethylbenzylammonium hydroxide. If ethyl acrylate or methylvinyl ketone is used, the corresponding groups are introduced in the 3-position, i.e., alkoxycarbonyl-lower alkyl and lower alkylcarbonyl-lower alkyl.

By starting with 1-benzyl-4-(3-alkyl-2-oxo-1-benzimidazolinyl)-1,2,3,6-tetrahydro-pyridine, two-step hydrogenation, through the debenzylated compound, gives the corresponding piperidine.

An alkylcarbonyl substituent may be introduced into the 3-position of the benzimidazolinyl moiety, where the nitrogen atom on the 1,2,3,6-tetrahydro-pyridine is protected as, for example, by a benzyl group, by treatment with an alkanoyl halide under reflux conditions in the presence of a nonaqueous inert organic solvent.

Depending upon the conditions employed during the course of the reaction, the novel compounds are obtained either in the form of the free bases or salts thereof. The salts are converted to the free bases in the usual manner, e.g., by reaction with alkali such as sodium or potassium hydroxide. The bases can be converted to their therapeutically useful acid addition salts by reaction with an appropriate organic or inorganic acid.

Especially useful acylating agents are the anhydrides of aliphatic carboxylic acids of low molecular weight, e.g., acetic, propionic, or butyric.

Organic solvents of advantage in conducting the necessary reactions of this invention include 4-methyl-2-pentanone, benzene, toluene, xylene, heptane, tetrahydrofuran, dioxane, ether. Where appropriate, solvents such as lower alkanols may be used, e.g., ethanol, butanol or isopropanol.

As a Grignard reagent one employs the lower alkyl magnesium halide appropriate for introduction of the desired alkyl group, e.g., methyl magnesium iodide, ethyl magnesium bromide, or propyl magnesium bromide.

Aldehydes used for introduction of the hydroxy-alkyl group are the aliphatic aldehydes from 1 to 5 carbon atoms—formaldehyde, acetaldehyde, propionaldehyde, butyraldehyde, and valeraldehyde.

Inorganic acids for converting the cyano group to the carbamoyl group are used in dilute aqueous solution and include sulfuric, hydrochloric and phosphoric.

The reduction and debenzylation reaction may be carried out with a variety of suitable reducing agents, for example catalytically activated hydrogen, e.g., hydrogen activated by a platinum, palladium or nickel catalyst such as platinum oxide or Raney nickel.

Introduction of an alkyl group into the 3-position of the benzimidazolone takes place, while the secondary amine (i.e., the piperidine function) is protected, by reaction with the appropriate quaternary ammonium alkyl halide in the presence of a base, such as sodium amide.

Replacement of the hydroxy function in the 3-hydroxyalkyl substituted benzimidazolinyl moiety is suitably effected by treatment with a sulfur or phosphorous oxyhalide as, for example, phosphorousoxychloride or, preferably, thionyl chloride. Furthermore, treatment of the resulting halogenated derivative with the appropriate alkali earth metal or alkali metal salt of a lower alkanol in the presence of a solvent suitable for such alkoxide, e.g., a lower alkanol, causes formation of the appropriate ether function, i.e., a lower alkoxy-lower alkyl group then resides in the 3-position of the benzimidazolinyl moiety.

The following examples are intended to illustrate, but not to limit, the scope of the present invention.

*Example I*

A mixture of 6.9 parts 4-bromo-2,2-diphenylbutyronitrile, 5 parts 4-(2-oxo-1-benzimidazolinyl)-piperidine, 7.3 parts sodium carbonate, a few crystals of potassium iodide in 160 parts 4-methyl-2-pentanone is stirred and refluxed for twenty-four hours. After cooling the reaction mixture, 100 parts water are added. The aqueous layer is separated and extracted once more with hexone. The combined organic layers are dried over $MgSO_4$ and evaporated. The oily residue is dissolved in a mixture of 24 parts diisopropylether and 24 parts isopropanol. After cooling overnight to −20° C., 5.3 parts product are obtained. This crop is boiled in 72 parts hexone and cooled to 0° C., yielding 1-(3-cyano-3,3-diphenyl-propyl)-4-(2-oxo-1-benzimidazolinyl)-piperidine, melting point 225–226° C., as a grey-white, amorphous powder.

*Example II*

A mixture of 62.7 parts 4-bromo-2,2-diphenylbutyronitrile, 45 parts 4-(2-oxo-1-benzimidazolinyl)-1,2,3,6-tetrahydropyridine, 66.4 parts sodium carbonate, 0.1 part potassium iodide in 800 parts n-butanol is stirred and refluxed for seventy-five hours. The reaction mixture is filtered hot, and the filtrate is concentrated to about half its volume. On cooling, a solid is precipitated. This is filtered and dried to yield a first crop of 24.5 parts 1-(3-cyano - 3,3-diphenyl-propyl)-4-(2-oxo-1-benzimidazolinyl)-1,2,3,6-tetrahydropyridine as a white, amorphous powder, melting point 182.5–186.4° C. On concentrating the mother liquor a second crop of less pure 1-(3-cyano - 3,3 - diphenylpropyl) - 4 - (2 - oxo - 1 - benzimidazolinyl)-1,2,3,6-tetrahydropyridine is obtained, melting point 180–184° C.

*Example III*

To a stirred mixture of 6.5 parts 4-(2-oxo-1-benzimidazolinyl)-piperidine, 9.6 parts sodium carbonate, a few crystals of potassium iodide in 136 parts 4-methyl-2-pentanone is added dropwise a solution of 9.9 parts 1-bromo-3,3-diphenylpropane in 40 parts 4-methyl-2-pentanone. After the addition is complete, the whole is stirred and refluxed for sixty-three hours. After cooling, 150 parts water are added. The aqueous layer is separated and extracted once more with hexone. The combined organic layers are dried over $K_2CO_3$ and evaporated. The residue is dissolved in 320 parts ether. The whole is filtered several times until clear and HCl gas is introduced into the filtrate. The precipitated hydrochloride is filtered off and recrystallized from 100 parts isopropanol. After cooling to 0° C., 7.8 parts crude product are filtered off. This crop is recrystallized from 56 parts butanone, yielding 5 parts crude product. This crop is recrystallized once more from a mixture of 56 parts butanone, 40 parts acetone and 24 parts ethanol. After cooling overnight to 0° C., 1-(3,3-diphenylpropyl)-4-(2-oxo-1-benzimidazolinyl)-piperidine hydrochloride is obtained, melting point 249–251° C., as a white, amorphous powder.

*Example IV*

A mixture of 5 parts 1-(3-cyano-3,3-diphenylpropyl)-4-(2-oxo-1-benzimidazolinyl)-piperidine, 5.9 parts acetic acid anhydride and 40 parts anhydrous toluene is stirred and refluxed for eight hours. The reaction mixture is cooled overnight and then the solvent is evaporated together with the excess of acetic acid anhydride. The solid residue is dissolved in water. The aqueous solution is alkalized with $NH_4OH$ and extracted with chloroform. The organic layer is dried over $K_2CO_3$ and evaporated. The solid residue is stirred in 32 parts diisopropylether, filtered off and dried, yielding 1-(3-cyano-3,3- diphenyl - propyl)-4-(3-acetyl-2-oxo-1-benzimidazolinyl)-piperidine, melting point 213–215° C., as a white, amorphous powder.

Example V

A mixture of 5 parts 1-(3-cyano-3,3-diphenylpropyl)-4-(2-oxo-1-benzimidazolinyl)-piperidine, 7.5 parts propionic acid anhydride and 80 parts benzene is stirred and refluxed for sixteen hours. After cooling, the reaction mixture is washed twice with 100 parts water. The aqueous layer is separated and alkalized with $NH_4OH$. The organic layer is dried over $K_2CO_3$, filtered and evaporated. The residue is recrystallized from 60 parts ether, yielding 4 parts crude 1-(3-cyano-3,3-diphenylpropyl)-4-(2 - oxo - 3 - propionyl - 1 - benzimidazolinyl)-piperidine. This crop is recrystallized once more from 20 parts hexone, yielding 1-(3-cyano-3,3-diphenylpropyl)-4-(2-oxo-3-propionyl-1-benzimidazolinyl)-piperidine, melting point 124.5–126° C., as a pale yellow, amorphous powder.

Example VI

A mixture of 3.25 parts 1-(3,3-diphenyl-4-oxo-hexyl)-4-(2-oxo-1-benzimidazolinyl)-piperidine, 3.5 parts acetic acid anhydride and 80 parts benzene is refluxed for twenty-one hours. After cooling, the reaction mixture is alkalized with $NH_4OH$. The organic layer is separated, dried over $K_2CO_3$, filtered and evaporated. The residue is dissolved in 20 parts ether. After keeping at room temperature, 1-(3,3-diphenyl-4-oxo-hexyl)-4-(3-acetyl-2-oxo-1-benzimidazolinyl)-piperidine is filtered off, melting point 158.6–160° C., as a yellow-white, granular powder.

Example VII

A mixture of 3.25 parts 1-(3,3-diphenyl-4-oxo-hexyl)-4-(2-oxo-1-benzimidazolinyl)-piperidine, 4.6 parts propionic acid anhydride and 80 parts benzene is stirred and refluxed for twenty-one hours. After cooling, the reaction mixture is alkalized with $NH_4OH$. The organic layer is separated, filtered and evaporated. The residue is dissolved in 40 parts ether. After keeping at room temperature, 1-(3,3-diphenyl-4-oxo-hexyl)-4-(2 - oxo - 3 - propionyl-1-benzimidazolinyl)-piperidine is filtered off, melting point 166–167° C., as a yellow-white, amorphous powder.

Example VIII

A mixture of 5 parts 1-(3-cyano-3,3-diphenylpropyl)-4-(2-oxo-1-benzimidazolinyl)-1,2,3,6 - tetrahydropyridine, 7.5 parts propionic acid anhydride and 80 parts anhydrous toluene is stirred and refluxed for six hours. After cooling the reaction mixture, 100 parts water are added. The aqueous layer is alkalyzed with $NH_4OH$ and extracted with toluene. The combined toluene layers are dried over $K_2CO_3$, and evaporated. The oily residue is triturated in 48 parts boiling ether and after cooling at room temperature, 1-(3-cyano-3,3-diphenylpropyl)-4-(2-oxo-3-propionyl-1-benzimidazolinyl)-1,2,3,6 - tetrahydropyridine is filtered off, melting point 139.2–140.6° C., as a pale yellow, amorphous powder.

Example IX

A mixture of 5 parts 1-(3-cyano-3,3-diphenylpropyl)-4-(2-oxo-1-benzimidazolinyl)-1,2,3,6 - tetrahydropyridine, 5.9 parts acetic acid anhydride and 80 parts anhydrous toluene is stirred and refluxed for six hours. After cooling, 100 parts water are added. The aqueous layer is alkalized with $NH_4OH$ and extracted with 100 parts chloroform (three times). The combined organic layers are dried over $K_2CO_3$, and evaporated. The solid residue is stirred in ether, filtered and the precipitate is recrystallized once more from 400 parts acetone. After cooling to room temperature 4-(3-acetyl-2-oxo-1-benzimidazolinyl)-1-(3-cyano-3,3-diphenylpropyl) - 1,2,3,6 - tetrahydropyridine is obtained, melting point 198.8–199.4° C., as an amorphous powder.

Example X

Starting from 1 part magnesium and 5.7 parts iodomethane in 32 parts anhydrous ether, a solution of methyl magnesium iodide is prepared in the usual manner. After cooling, there are added first 80 parts toluene, followed by 5 parts 1-(3-cyano-3,3-diphenylpropyl)-4-(2-oxo - 1 - benzimidazolinyl)-piperidine. The whole is refluxed for fifteen hours. The ether is evaporated. The residue is decomposed with 100 parts HCl 20%: three layers are obtained. The aqueous layer together with an oily layer is separated and this mixture is alkalized with $NH_4OH$ and then extracted with chloroform. The organic layer is dried over $K_2CO_3$, and evaporated. The oily residue crystallizes from diethylether, yielding 1-(3,3-diphenyl-4-oxo-pentyl)-4-(2-oxo-1 - benzimidazolinyl)-piperidine, melting point 188.5–199° C., as a pale beige, amorphous powder.

Example XI

Starting from 13 parts bromo ethane and 3 parts magnesium a solution of ethyl magnesium bromide in 150 parts diethylether is prepared in the usual manner. To the obtained solution are added 250 parts toluene, whereupon most of the ether is distilled off. Then 14 parts 1-(3-cyano-3,3-diphenyl-propyl) - 4 - (2-oxo-1-benzimidazolinyl)-piperidene are added portionwise, while stirring, and after the addition is complete the whole is stirred and refluxed for twenty hours. The complex is decomposed by addition of 300 parts HCl 2 N and the whole is now refluxed for six hours. Three layers are obtained. The aqueous layer and the oily layer are separated from the toluene solution and to these combined layers is added excess ammonia. The hole is then extracted with chloroform.

The chloroform solution is dried over $K_2CO_3$, filtered and evaporated. The solid residue is triturated in 100 parts ether and filtered to yield 1-(3,3-diphenyl-4-oxo-hexyl)-4-(2-oxo-1 - benzimidazolinyl)-piperidine, melting point 167.8–170° C., as a beige, amorphous powder.

Example XII

To a solution of methyl magnesium iodide, prepared in the usual manner from 3.9 parts magnesium, 22.7 parts iodomethane in 128 parts anhydrous diethylether, are added respectively 19.8 parts 1-(3-cyano-3,3-diphenylpropyl)-4-(2-oxo-1 - benzimidazolinyl) - 1,2,3,6 - tetrahydropyridine and 320 parts anhydrous toluene. After the addition is complete, the ether is evaporated until a temperature of 100° C. is obtained. Then the whole is stirred and refluxed for sixteen hours. After cooling, the reaction mixture is decomposed with 400 parts 20% aqueous hydrochloric acid. Then the whole is stirred for six hours at a temperature of about 80° C. After cooling, the toluene layer is separated. The aqueous layer, together with the oily layer, is alkalized with $NH_4OH$ and extracted with chloroform. The organic layers are dried over $K_2CO_3$, and evaporated. The oily residue is dissolved in a mixture of 32 parts ether and 8 parts acetone. After cooling to room temperature, 1-(3,3-diphenyl-4-oxo-pentyl)-4-(2-oxo-1 - benzimidazolinyl)-1,2,3,6-tetrahydropyridine is filtered off, melting point 198–201° C., as a beige, amorphous powder.

Example XIII

A solution of propyl magnesium bromide is prepared in the usual manner, starting from 2.4 parts magnesium, 12.3 parts 1-bromopropane in 32 parts anhydrous ether. To this solution is added dropwise a solution of 12.2 parts 1-(3-cyano-3,3-diphenylpropyl)-4-(2-oxo-1-benzimidazolinyl)-piperidine in 160 parts anisole. After the addition is complete, the whole is stirred and refluxed for twenty hours at 120–130° C. (oil bath). (During the beginning of this heating most of anhydrous ether is distilled off through the condenser.) After cooling the reaction mixture, the precipitate (ketimine) is filtered off. It is refluxed for one hour in a mixture of 180 parts 4 N hydrochloric acid and 120 parts toluene. After cooling, the solution is alkalized with NH₄OH. The aqueous layer is separated and extracted once more with toluene. The organic layer is separated, dried over K₂CO₃, and evaporated. The oily residue is boiled in diisopropylether. The ether is decanted and kept at room temperature to yield 1-(3,3-diphenyl-4-oxo-heptyl)-4-(2-oxo-1-benzimidazolinyl)-piperidine, melting point 192–197° C., as a yellow, amorphous powder.

*Example XIV*

A mixture of 4.3 parts 1-(3-cyano-3,3-diphenylpropyl)-4 - (2 - oxo - 1 - benzimidazolinyl) - 1,2,3,6 - tetrahydropyridine, 10 parts 37% formaline and 40 parts 2-propanol is stirred and refluxed for twenty hours. After cooling, the reaction mixture is diluted with 80 parts benzene. The whole is filtered and HCl gas is introduced into the filtrate. The precipitated hydrochloride is filtered off and recrystallized from 40 parts isopropanol to yield 1 - (3 - cyano - 3,3 - diphenylpropyl) - 4 - (3 - hydroxymethyl - 2 - oxo - 1 - benzimidazolinyl) - 1,2,3,6 - tetrahydropyridine hydrochloride, melting point 174–178° C. as a white, amorphous powder.

*Example XV*

A mixture of 4 parts 1-(3-cyano-3,3-diphenylpropyl)-4-(2-oxo-1-benzimidazolinyl)-piperidine, 10 parts 38% formaline and 48 parts 2-propanol is stirred and refluxed for sixteen hours. On cooling the reaction mixture, the product crystallizes, yielding 1-(3-cyano-3,3,-diphenylpropyl) - 4 - (3 - hydroxymethyl - 2 - oxo - 1- benzimidazolinyl)-piperidine, melting point 194–195° C., as a white amorphous powder.

*Example XVI*

A mixture of 1.5 parts 1-(3,3-diphenyl-4-oxo-pentyl)-4-(2-oxo-1-benzimidazolinyl)-piperidine, 5 parts 38% formaline and 32 parts 2-propanol is stirred and refluxed for fifteen hours. After cooling, 40 parts water are added. The formed precipitate is filtered off to yield 1 - (3,3 - diphenyl - 4 - oxo - pentyl) - 4 - (3 - hydroxymethyl-2-oxo - 1 - benzimidazolinyl) - piperidine hydrate, melting point 162–176.6° C., as a grey-white, amorphous powder.

This crop contains one molecule of water of crystallization.

*Example XVII*

A mixture of 2.5 parts 1-(3,3-diphenyl-4-oxo-hexyl)-4-(2-oxo-1-benzimidazolinyl)-piperidine, 10 parts 37% formaline and 48 parts 2-propanol is stirred and refluxed for thirty-one hours. After cooling, the reaction mixture is evaporated. The oily residue is dissolved in a mixture of 40 parts toluene and 40 parts diethylether and HCl gas is introduced into the solution. The precipitated hydrochloride is filtered off and recrystallized from a mixture of 16 parts isopropanol and 24 parts ethyl acetate. After keeping at room temperature 1-(3,3 - diphenyl - 4 - oxo - hexyl) - 4 - (3 - hydroxymethyl-2-oxo-1-benzimidazolinyl)-piperidine hydrochloride is obtained, melting point 209–232° C. (dec.), as a white, granular powder.

*Example XVIII*

A mixture of 15.25 parts 1-benzyl-4-(2-oxo-1-benzimidazolinyl)-1,22,6-tetrahydropyridine, 2.4 parts so-dilute sulfuric acid (91%/vol.) is heated at 100° C. for four hours. The reaction mixture is poured into 100 parts ice water. An oil is formed which slowly solidifies. It is alkalized with NH₄OH and extracted with chloroform (5 x 450 parts). The undissolved part is filtered off and the filtrate is dried over MgSO₄, filtered and evaporated. The oily residue is dissolved in 40 parts isopropanol. After keeping at room temperature, 2.2 parts product are filtered off. This crop is recrystallized from a mixture of 24 parts isopropanol and 16 parts ethanol. After keeping at room temperature 1-(3-carbamoyl - 3,3 - diphenylpropyl) - 4 - (2 - oxo - 1-benzimidazolinyl)-piperidine is obtained, melting point 220.4–222° C., as pale yellow crystals.

*Example XIX*

A mixture of 15.25 parts 1-benzyl-4-(2-oxo-1-benzimidazolinyl)-1,2,3,6-tetrahydropyridine, 2.4 parts sodamide and 160 parts toluene is refluxed until no more NH₃ gas is evolved. After cooling, there are added 10.8 parts N,N,N-trimethylanilinium bromide and the whole is refluxed for forty-eight hours. After cooling the reaction mixture, 100 parts water are added. The aqueous layer is separated and extracted three times with toluene. The combined organic layers are dried over MgSO₄ and evaporated. The oily residue is dissolved in 640 parts diisopropylether and filtered several times until a clear solution is obtained. Then HCl gas is introduced into the filtrate. The precipitated hydrochloride is filtered off and recrystallized from 280 parts alcohol. After cooling at room temperature, 1-benzyl-4-(3 - methyl - 2 - oxo - 1 - benzimidazolinyl) - 1,2,3,6-tetrahydropyridine hydrochloride is obtained, melting point 261–263.5° C., as a white, amorphous powder.

After cooling the mother liquor to —20° C., a second fraction of less pure 1-benzyl-4-(3-methyl-2-oxo-1- benzimidazolinyl)-1,2,3,6-tetrahydropyridine hydrochloride is filtered off, melting point 251–257° C.

*Example XX*

A mixture of 11.7 parts 1-benzyl-4-(3-methyl-2-oxo-1 - benzimidazolinyl) - 1,2,3,6 - tetrahydropyridine hydrochloride, 52 parts acetic acid and 40 parts absolute ethanol is debenzylated at normal pressure and at a temperature of about 40° C. in the presence of 3 parts palladium-on-charcoal catalyst 10%. After the calculated amount of hydrogen is taken up, hydrogenation is stopped. The charcoal is filtered off and the filtrate is evaporated. The residue is stirred in 40 parts acetone to yield the crude product. This crop is recrystallized from 160 parts isopropanol. After cooling to 0° C., 4 - (3 - methyl - 2 - oxo - 1 - benzimidazolinyl)-piperidine hydrochloride is obtained, melting point 225–230° C.

*Example XXI*

A mixture of 25.9 parts 1-benzyl-4-(3-methyl-2-oxo-1-benzimidazolinyl)-1,2,3,6-tetrahydropyridine, 126 parts acetic acid and 100 parts absolute ethanol is debenzylated at normal pressure and at a temperature of about 40–45° C. in the presence of 6 parts palladium-on-charcoal catalyst 10%. After the calculated amount of hydrogen is taken up, hydrogenation is stopped. The catalyst is filtered off and the filtrate is evaporated. The residue is dissolved in 150 parts water. The aqueous solution is alkalized with ammonium hydroxide and extracted with chloroform. The organic layer is dried over magnesium sulfate and evaporated. The oily residue crystallizes on stirring in 80 parts diisopropylether, yielding 4-(3-methyl-2-oxo-1 - benzimidazolinyl) - piperidine, melting point 142–145.8° C.

*Example XXII*

A solution of 40 parts 1-benzyl-4-(2-oxo-1-benzimidazolinyl)-1,2,3,6-tetrahydropyridine in 240 parts absolute ethanol is hydrogenated under atmospheric pressure and at a temperature of 40° C., in the presence of 10 parts Pd on charcoal catalyst. After the calculated amount of H₂ is taken up, hydrogenation is stopped. The charcoal is filtered off and the filtrate is evaporated. The oily residue is dissolved in a mixture of 40 parts toluene and 40 parts ethyl acetate. On keeping at room temperature, 16.5 parts product are obtained. This crop is recrystallized from 80 parts xylene and kept at room temperature, yielding a first fraction of 5.9 parts 4-(2-oxo-benzimidazolinyl)-1,2,3,6-tetrahydropyridine, melting point 181–191° C. The filtrate is concentrated to a volume of about 50 parts. On keeping this residue at room temperature, a second fraction of 4-(2-oxo-1-benzimidazolinyl)-1,2,3,6-tetrahydropyridine is obtained, melting point 184–190° C.

*Example XXIII*

To a solution of 15.3 parts 1-benzyl-4-(2-oxo-1-benzimidazolinyl)-1,2,3,6-tetrahydropyridine in 80 parts anhydrous benzene is added dropwise a solution of 4 parts acetyl chloride in 16 parts anhydrous benzene. After the addition is complete, the whole is stirred and refluxed for two hours in a steam bath. The formed precipitate is filtered off, boiled in butanone and filtered off again to yield 12.5 parts product. This crop is boiled in 280 parts isopropanol. The undissolved part is filtered hot to yield 1-benzyl-4-(3-acetyl-2-oxo-1-benzimidazolinyl)-1,2,3,6-tetrahydropyridine hydrochloride, melting point 244.5–248° C., as white scales.

After cooling the filtrate at −15° C., a second crop of 1.8 parts product is filtered. On further cooling of the filtrate at room temperature, a third crop of 1-benzyl-4 - (3 - acetyl - 2 - oxo - 1 - benzimidazolinyl) - 1,2,3,6-tetrahydropyridine hydrochloride is obtained, melting point 238–244° C.

*Example XXIV*

To a stirred mixture of 4.3 parts 4-(2-oxo-1-benzimidazolinyl)-piperidine, 3.2 parts sodium carbonate, a few crystals of potassium iodide in 160 parts 4-methyl-2-pentanone is added dropwise a solution of 5.4 parts 3-chloro-1,1-diphenylpropanol in 40 parts 4-methyl-2-pentanone. After the addition is complete, the whole is stirred and refluxed for sixty hours. After cooling, 75 parts of water are added. he undissolved part is filtered off to yield 6.1 parts crude product. This crop is boiled in 160 parts acetone. The undissolved part is filtered off, yielding 4.1 parts crude 1-(3,3-diphenyl-3-hydroxypropyl)-4-(2-oxo-1-benzimidazolinyl)-piperidine. After cooling this filtrate to −20° C. for five hours, a first crop of pure 1-(3,3-diphenyl-3-hydroxypropyl)-4-(2-oxo-1 - benzimidazolinyl)-piperidine is obtained, melting point 237–239° C., as a white, flaky powder.

The crude fraction is boiled in 240 parts acetone. The undissolved part is filtered off (mixture of free base and hydrochloride) and after cooling the filtrate to −20° C. for five hours, a second fraction of 1-(3,3-diphenyl-3-hydroxypropyl)-4-(2-oxo-1-benzimidazolinyl)-piperidine is obtained, melting point 241.5–242° C.

*Example XXV*

A mixture of 8.7 parts 1-(3-cyano-3,3-diphenyl-propyl)-4-(2-oxo-1-benzimidazolinyl)-piperidine, 1.2 parts triethylbenzylammonium hydroxide and 150 parts tetrahydrofurane is heated to 55° C. While maintaining this temperature, 8.4 parts acrylonitrile are added portionwise (slightly exothermic reaction). After the addition is complete, the whole is stirred for three and one-half hours at 65° C. The whole is evaporated. The oily residue is dissolved in a mixture of 80 parts 2-propanol and 400 parts ether and gaseous hydrochloric acid is introduced into the solution: an oily hydrochloride is obtained, which solidifies on boiling in a mixture of 32 parts acetone and 16 parts 4-methyl-2-pentanone. After cooling to room temperature, a sticky precipitate is filtered off. It is triturated in 32 parts acetone and filtered, yielding 5.5 parts product. This crop is dissolved in a mixture of 40 parts acetone and 40 parts 2-propanol. After cooling overnight to −20° C., 1-(3-cyano-3,3-diphenyl-propyl)-4-[3-(2-cyano-ethyl)-2-oxo-1-benzimidazolinyl]-piperidine hydrochloride hydrate is obtained, melting point 261–263.4° C., as a white, amorphous powder.

*Example XXVI*

A mixture of 8.7 parts 1-(3-cyano-3,3-diphenyl-propyl)-4-(2-oxo-1-benzimidazolinyl)-1,2,3,6 - tetrahydropyridine, 1.2 parts trimethylbenzylammonium hydroxide and 160 parts dry tetrahydrofurane is heated to 55° C. While maintaining this temperature, 8.4 parts acrylonitrile are added portionwise. After the addition is complete, the whole is refluxed for three hours. After cooling, the reaction mixture is filtered and the filtrate is evaporated. The oily residue is dissolved in a mixture of acetone and diisopropylether and gaseous hydrochloric acid is introduced into the solution. The whole is evaporated. The oily residue solidifies on scratching in acetone, yielding 1-(3 - cyano - 3,3-diphenylpropyl-4-[3-(2-cyano-ethyl) - 2-oxo-1-benzimidazolinyl] - 1,2,3,6 - tetrahydropyridine hydrochloride, melting point 230–236° C., as a pale beige, amorphous powder.

*Example XXVII*

To a mixture of 5 parts 4-[3-(chloro-methyl)-2-oxo-1-benzimidazolinyl] - 1 - (3,3-diphenylpropyl) - piperidine hydrochloride and 56 parts absolute ethanol is added dropwise a solution of sodium ethoxide, prepared from 1.5 parts sodium in 24 parts ethanol. After the addition is complete, the whole is stirred and refluxed for three hours. The reaction mixture is evaporated. The residue is divided between 400 parts ether and 100 parts water. The organic layer is separated, dried over potassium carbonate and gaseous hydrogen chloride is introduced into it: a semisolid hydrochloride is obtained which solidifies on boiling in 40 parts 2-propanol, yielding 1-(3,3-diphenylpropyl) - 4-[3-(ethoxymethyl)-2-oxo - 1 - benzimidazolinyl]-piperidine hydrochloride, melting point 126.8–130° C., as a pale yellow, amorphous powder.

*Example XXVIII*

To a mixture of 5 parts 4-[3-(chloro-methyl)-2-oxo-1-benzimidazolinyl] - 1 - (3,3 - diphenylpropyl) - piperidine hydrochloride and 56 parts methanol is added dropwise a solution of sodium methoxide, prepared from 1.5 parts sodium and 24 parts methanol. After the addition is complete, the whole is stirred and refluxed for three hours. The reaction mixture is evaporated. The residue is divided between 400 parts ether and 100 parts water. The organic layer is separated, dried over potassium carbonate and gaseous hydrogen chloride is introduced into it: a semisoild hydrochloride is obtained, which solidifies on triturating in 80 parts boiling 2-propanol. After cooling to −20° C., 1-(3,3-diphenylpropyl)-4-[3-(methoxymethyl)-2-oxo-1-benzimidazolinyl]-piperidine hydrochloride is obtained, melting point 148–152° C., as a grey-white, amorphous powder.

*Example XXIX*

To a mixture of 5 parts 4-[3-(chloro-methyl)-2-oxo-1-benzimidazolinyl] - 1 - (3,3-diphenylpropyl) - 1,2,3,6-tetrahydropyridine hydrochloride and 56 parts methanol is added dropwise a solution of sodium methoxide, prepared from 1.5 parts sodium and 24 parts methanol. After the addition is complete, the whole is stirred and refluxed for three hours. The reaction mixture is evaporated. The residue is divided between 400 parts ether and 100 parts water. The organic layer is separated, dried over potassium carbonate and gaseous hydrogen chloride is introduced into it. A semisolid precipitate is obtained. The ether is decanted and the residue is triturated in 80 parts boiling 2-propanol. After cooling for one hour at −20° C., 4-[3-(methoxymethyl) - 2 - oxo-1-benzimidazolinyl] - 1 - (3,3 - diphenylpropyl) - 1,2,3,6 - tetrahydropyridine hydrochloride is obtained, melting point 175–180° C., as a pale yellow, granular powder.

*Example XXX*

To a mixture of 5 parts 4-[3-(chloro-methyl)-2-oxo-1-benzimidazolinyl] - 1 - (3,3 - diphenylpropyl) - 1,2,3,6-tetrahydropyridine hydrochloride and 56 parts absolute ethanol is added dropwise a solution of sodium ethoxide, prepared from 1.5 parts sodium and 24 parts ethanol. After the addition is complete, the whole is stirred and refluxed for three hours. After keeping overnight at room temperature, the reaction mixture is divided between 400 parts ether and 100 parts water. The organic layer is separated, dried over sodium sulfate, filtered and the filtrate is evaporated. The semisolid residue is dissolved again in ether. The obtained solution is dried over potassium carbonate, filtered and evaporated. The oily residue is dissolved in 20 parts acetone. This solution is poured into 320 parts ether and then gaseous hydrogen chloride is introduced into it: an oily hydrochloride is obtained. The solvent is decanted. The oily residue is dissolved in 32 parts 4-methyl-2-pentanone, while stirring this solution is poured into 320 parts diisopropylether. A solid is precipitated. It is filtered off and dissolved in 32 parts 4-methyl-2-pentanone. After cooling to room temperature, an oil is obtained. The solvent is decanted and cooled to −20° C., whereupon once more an oil is separated. The supernatant solvent is decanted and poured into 240 parts diisopropylether. The precipitated solid is filtered off, yielding 1-(3,3-diphenylpropyl) - 4 - [3 - (ethoxy - methyl)-2-oxo-1-benzimidazolinyl] - 1,2,3,6-tetrahydropyridine hydrochloride, melting point 101–111° C. (dec.), as a pale beige microcrystalline powder.

Example XXXI

A mixture of 110 parts 1-bromo-3,3-diphenylpropane, 78 parts 4-(2-oxo-1-benzimidazolinyl)-piperidine, 114 parts sodium carbonate, a few crystals of potassium iodide in 2000 parts 4-methyl-2-pentanone is stirred and refluxed for sixty hours. The reaction mixture is filtered and concentrated, whereupon a solid is precipitated. It is filtered off, washed with acetone and dried, yielding 1-(3,3-diphenylpropyl) - 4 - (2-oxo-1-benzimidazolinyl)-piperidine, melting point 178.8–180.4° C., as a white, amorphous powder.

Example XXXII 43.5 parts 1-(3,3-diphenylpropyl)-4-(3-hydroxymethyl-2-oxo-1-benzimidazolinyl)-piperidine hydrochloride are dissolved in 125 parts thionyl chloride, at a temperature of 10° C. (cooling with ice bath). The obtained solution is stirred for two hours at room temperature. The reaction mixture is poured into 800 parts diisopropylether, whereupon a precipitate is formed. It is filtered off and triturated in 80 parts acetone and filtered again. The filter cake is washed twice with acetone and dried, yielding less pure 4-[3-(chloro-methyl)-2-oxo-1-benzimidazolinyl]-(3,3 - diphenylpropyl) - piperidine hydrochloride, melting point 254–260° C.

A sample of 3 parts is purified by recrystallization from 120 parts boiling acetone. The undissolved part is filtered off and dried, yielding 4-[3-(chloro-methyl)-2 - oxo-1 - benzimidazolinyl] - 1 - (3,3 - diphenylpropyl)-piperidine hydrochloride, melting point 249–258° C.

Example XXXIII 37.7 parts 1-(3,3-diphenylpropyl)-4-(3-hydroxymethyl-2-oxo-1 - benzimidazolinyl) - 1,2,3,6 - tetrahydropyridine hydrochloride are dissolved in 100 parts thionyl chloride at a temperature of about 10° C. (cooling in ice bath). The obtained solution is stirred for two hours at room temperature. The reaction mixture is poured into 800 parts diisopropylether, whereupon a solid is precipitated. It is filtered off, washed with acetone and dried, yielding crude 4-[3-(chloromethyl)-2-oxo-1-benzimidazolinyl]-1-(3,3-diphenylpropyl) - 1,2,3,6 - tetrahydropyridine hydrochloride.

This crop is triturated in 80 parts acetone to yield 4-[3-(chloro-methyl) - 2 - oxo - 1 - benzimidazolinyl] - 1 - (3,3-diphenylpropyl) - 1,2,3,6 - tetrahydropyridine hydrochloride, melting point 211–213° C. (dec.).

Example XXXIV

To a solution of 8.7 parts 1-(3-cyano-3,3-diphenyl-propyl)-4-(2-oxo-1-benzimidazolinyl)-piperidine in 160 parts dry tetrahydrofurane are added portionwise 1.2 parts trimethylbenzylammonium hydroxide and 16 parts ethyl acrylate, at a temperature of 55–60° C. While maintaining this temperature the whole is stirred for twenty-four hours. The reaction mixture is filtered and evaporated. The oily residue is dissolved in 40 parts acetone and this solution is evaporated again. The solid residue is boiled in 40 parts acetone. After cooling to room temperature, the formed precipitate is filtered off and washed twice with 12 parts acetone, yielding 1-(3-cyano-3,3-diphenylpropyl) - 4 - [3 - (2 - ethoxy-carbonyl-ethyl)-2 - oxo - 1 - benzimidazolinyl] - piperidine, melting point 166–168° C., as a white, amorphous powder. On keeping the acetone washings at room temperature, a second pure fraction of 1-(3-cyano-3,3-diphenylpropyl)-4-[3-(2-ethoxy-carbonylethyl) - 2-oxo-1-benzimidazolinyl]-piperidine is filtered off, melting point 158.6–163.6° C.

Example XXXV

To a solution of 8.7 parts 1-(3-cyano-3,3-diphenyl-propyl)-4 - (2 - oxo - 1 - benzimidazolinyl)-1,2,3,6-tetrahydropyridine in 160 parts dry tetrahydrofurane are added portionwise 1.2 parts trimethylbenzylammonium hydroxide and 16 parts ethyl acrylate, at a temperature of 55–60° C. While maintaining this temperature the whole is stirred for twenty-four hours. The reaction mixture is filtered and evaporated. The oily residue is dissolved in 32 parts acetone and this solution is evaporated again. The solid residue is boiled in 40 parts acetone. After cooling to room temperature, the formed precipitate is filtered off, washed with 80 parts acetone and dried, yielding 1-(3-cyano-3,3-diphenylpropyl)-4-[3-(2-ethoxy-carbonyl-ethyl)-2-oxo-1 - benzimidazolinyl]-1,2,3,6-tetrahydropyridine, melting point 151–153.5° C., as a white, amorphous powder.

Example XXXVI

To a solution of 8.2 parts 1-(3,3-diphenylpropyl)-4-(2-oxo-1-benzimidazolinyl)-piperidine, 1.2 parts trimethylbenzylammonium hydroxide and 160 parts dry tetrahydrofurane are added portionwise 16 parts ethyl acrylate at a temperature of 60° C. After the addition is complete the whole is stirred for twenty-four hours at the same temperature. The reaction mixture is filtered and evaporated. The oily residue is dissolved in 32 parts acetone. This solution is poured into 320 parts diisopropylether and gaseous hydrogen chloride is introduced into it. The whole is evaporated. The oily residue solidifies in 2-propanol while scratching, yielding 1-(3,3-diphenylpropyl) - 4 - [3-(2-ethoxy-carbonyl-ethyl)-2-oxo-1-benzimidazolinyl]-piperidine hydrochloride, melting point 104–125° C. (dec.), as a white, amorphous powder.

Example XXXVII

A mixture of 8.2 parts 1-(3,3-diphenylpropyl)-4-(2-oxo-1-benzimidazolinyl) - 1,2,3,6 - tetrahydropyridine, 1.2 parts trimethylbenzylammonium hydroxide and 160 parts dry tetrahydrofurane is heated to 60° C. At this temperature there are added dropwise 16 parts ethyl acrylate. After the addition is complete the whole is stirred for twenty-four hours while maintaining this temperature. The reaction mixture is filtered while hot and evaporated. The oily residue is dissolved in a mixture of 32 parts acetone and 400 parts diisopropylether and then gaseous hydrogen chloride is introduced into this solution. The precipitated solid hydrochloride is filtered off and dissolved in 80 parts boiling 2-propanol. The whole is evaporated, yielding 1-(3,3-diphenylpropyl)-4-[3-(2-ethoxy-carbonyl-ethyl) - 2 - oxo - 1 - benzimidazolinyl]-1,2,3,6-tetrahydropyridine hydrochloride, melting point 114.2–131° C., as a pale yellow, amorphous powder.

Example XXXVIII

To a solution of 8.7 parts 1-(3-cyano-3,3-diphenyl-propyl)-4-(2-oxo - 1 - benzimidazolinyl) - piperidine, 1.2 parts trimethylbenzylammonium hydroxide and 120 parts dry tetrahydrofurane are added portionwise 11.2 parts 3-oxo-but-1-ene, at a temperature of 60° C. After the addition is complete, the whole is stirred for twenty hours at the same temperature. The reaction mixture is filtered and the filtrate is evaporated. The oily residue is dissolved in a mixture of 120 parts 2-propanol and 240 parts diisopropylether and gaseous hydrogen chloride is introduced into the solution: no precipitate is formed. The whole is evaporated. The residue is dissolved in 500 parts boiling water. The obtained solution is treated with activated charcoal, filtered and alkalized with ammonium hydroxide, whereupon a precipitate is formed. It is filtered off and dried, yielding 1-(3-cyano-3,3-diphenyl)-4-[2-oxo-3-(3-oxo-butyl) - 1-benzimidazolinyl]-piperidine, melting point 57–67° C., as a beige, granular powder.

*Example XXXIX*

(A) A mixture of 6.5 parts 1-(3,3-diphenyl-4-oxo-hexyl)-4-(2-oxo-1-benzimidazolinyl)-piperidine, 0.4 part triethylbenzylammonium hydroxide in 15 parts dioxane is warmed with stirring to 40–50° C. While maintaining this temperature, 3.12 parts acrylonitrile are added dropwise. After the addition is complete, the whole is held at 40–50° C. for three and one-half hours more. The solvent is then evaporated and the residual oil is taken up in 25 parts 2-propanol. From this solution a crystalline precipitate is separated at room temperature. This precipitate is recrystallized from 55 parts methanol to yield 4-[3-(2-cyano - ethyl)-2-oxo-1-benzimidazolinyl]-1- (3,3 - diphenyl - 4 - oxo - hexyl)-piperidine, melting point 165.8–167° C., as light yellow, glistening crystals.

(B) The procedure of Example XXXIX-(A) is followed using equivalent quantities of ethyl acrylate and methyl vinyl ketone, respectively instead of the acrylonitrile of Example XXXIX-(A) to yield the corresponding 1-(3,3-diphenyl-4-oxo-hexyl)-4-[3-(2-ethoxycarbonyl-ethyl) - 2 - oxo - 1 - benzimidazolinyl - piperidine and 1-(3,3 - diphenyl - 4 - oxo - hexyl) - 4 - ] - 3 - (2 - methyl-carbonylethyl)-2-oxo-1-benzimidazolinyl - piperidine, respectively.

*Example XL*

A mixture of 8.7 parts 1-(3-cyano-3,3-diphenyl-propyl)-4-(2-oxo-1-benzimidazolinyl)-piperidine, 35.2 parts 1,3-dioxa-2-oxo-cyclopentane and 2 parts anhydrous sodium carbonate is stirred and heated at 190° C. for one hour and fifteen minutes ($CO_2$-gas is evolved). After cooling the solid residue is divided between 100 parts water and 200 parts chloroform. The organic layer is separated, washed once more with 50 parts water, dried over sodium sulfate, filtered and evaporated. The thick oily residue is dissolved in 60 parts acetone. After cooling for one hour at —20° C., the solvent is decanted. This solvent is cooled again overnight at —20° C. and decanted from the formed oil. The actone is poured into 480 parts diisopropylether, whereupon a precipitate is formed. This is filtered off and gaseous hydrogen chloride is introduced into the filtrate. The solvent is decanted and the oily residue is triturated in diisopropylether, yielding 3.4 parts product. This crop is triturated in 80 parts boiling 2-propanol, the undissolved part is filtered off, yielding 1-(3-cyano - 3,3 - diphenylpropyl) - 4 - [3 - (2 - hydroxyethyl)-2 - oxo - 1 - benzimidazolinyl] - piperidine hydrochloride, melting point 286–293° C., as a white amorphous powder.

*Example XLI*

2.3 parts 1 - (3 - cyano - 3,3 - diphenylpropyl) - 4 - (3-hydroxymethyl-2-oxo-1-benzimidazolinyl)-piperidine are dissolved in 8 parts thionyl chloride at a temperature of 16° C. This solution is kept at room temperature for two hours. Then the reaction mixture is poured into diisopropylether. The formed precipitate is filtered off and triturated in 12 parts acetone, yielding 4-(3-chloro-methyl - 2 - oxo - 1 - benzimidazolinyl) - 1 - (3 - cyano- 3,3-diphenyl-propyl) - piperidine hydrochloride, melting point 268–320° C. (dec.), as a white, amorphous powder.

*Example XLII*

11 parts 1 - (3 - cyano - 3,3 - diphenylpropyl) - 4 - (3-hydroxymethyl - 2 - oxo - 1 - benzimidazolinyl) - 1,2,3,6-tetrahydropyridine hydrochloride are dissolved in 20 parts thionyl chloride, while cooling in an ice bath. This solution is stirred for one hour, while cooling. The reaction mixture is poured into anhydrous ether: a precipitate is formed. The solvent is decanted and set aside and the residue is washed with acetone and dried, yielding 4-(3-chloro - methyl) - 2 - oxo - 1 - benzimidazolinyl) - 1 - (3-cyano-3,3-diphenylpropyl) - 1,2,3,6 - tetrahydropyridine hydrochloride, melting point 238.8–245° C. (dec.), as a grey-white, amorphous powder.

The mother liquor (decanted ether) is diluted with ether. A precipitate is formed, which is filtered off, washed with acetone, filtered off again and dried, yielding less pure 4 - (3 - chloro - methyl - 2 - oxo - 1 - benzimidazolinyl) - 1 - (3 - cyano - 3,3 - diphenylpropyl) - 1,2,3,6-tetrahydropyridine hydrochloride, melting point 232–237° C. (dec.).

*Example XLIII*

To a stirred mixture of 5.21 parts 4-(3-chloro-methyl-2-oxo - 1 - benzimidazolinyl) - 1 - (3 - cyano - 3,3 - diphenyl-propyl) - 1,2,3,6 - tetrahydropyridine hydrochloride in 56 parts methanol is added dropwise a solution of sodium methoxide, prepared from 1.5 parts sodium in 24 parts methanol. After the addition is complete, the whole is stirred and refluxed for three hours. After cooling, the reaction mixture is concentrated under reduced pressure. To the residue are added 50 parts water and the whole is extracted with 400 parts ether. The organic layer is separated, dried over potassium carbonate, filtered and gaseous hydrogen chloride is introduced into the filtrate. The precipitated solid hydrochloride is filtered off and dried to yield 1 - (3 - cyano - 3,3 - diphenylpropyl) - 4 - [3-(methoxymethyl) - 2 - oxo - 1 - benzimidazolinyl] - 1,2,3,-6-tetrahydropyridine hydrochloride, melting point 229–231° C., as a yellow, granular powder.

*Example XLIV*

To a stirred mixture of 5.21 parts 4-(3-chloro-methyl-2 - oxo - 1 - benzimidazolinyl) - 1 - (3 - cyano - 3,3 - di-phenyl - propyl) - 1,2,3,6 - tetrahydropyridine hydrochloride in 56 parts ethanol is added dropwise a solution of sodium ethoxide, prepared from 1.5 parts sodium in 24 parts ethanol. After the addition is complete, the whole is stirred and refluxed for three hours. After cooling, the reaction mixture is concentrated under reduced pressure. The residue is washed with 50 parts water and extracted with 400 parts ether. The organic layer is separated, dried over potassium carbonate, filtered and gaseous hydrogen chloride is introduced into the filtrate. The precipitated solid hydrochloride is filtered off and dried, yielding crude 1 - (3 - cyano - 3,3 - diphenylpropyl) - 4,3 - (ethoxy-methyl) - 2 - oxo - 1 - benzimidazolinyl - 1,2,3,6 - tetra-hydropyridine hydrochloride. This crop is recrystallized from 56 parts 2-propanol. After cooling overnight at 0° C., 1 - (3 - cyano - 3,3 - diphenylpropyl) - 4 - [3 - (ethoxy-methyl) - 2 - oxo - 1 - benzimidazolinyl] - 1,2,3,6 - tetra-hydropyridine hydrochloride is filtered off, melting point 226–228° C., as a pale yellow, granular powder.

*Example XLV*

To a stirred mixture of 5.21 parts 4-(3-chloro-methyl-2 - oxo - 1 - benzimidazolinyl) - 1 - (3 - cyano - 3,3 - di-phenyl - propyl) - piperidine hydrochloride in 56 parts ethanol is added dropwise a solution of sodium ethoxide, prepared from 1.5 parts sodium in 24 parts ethanol. After the addition is complete, the whole is stirred and refluxed for three hours. The reaction mixture is evaporated. The residue is washed with 50 parts water and extracted with 400 parts ether. The organic layer is separated, dried over potassium carbonate, filtered and gaseous hydrogen chloride is introduced into the filtrate. The precipitated solid hydrochloride is filtered off and dried, yielding crude 1 - (3 - cyano - 3,3 - diphenylpropyl) - 4 - [3 - ethoxymethyl) 2 - oxo - 1 - benzimidazolinyl] - piperidine hydrochloride. This crop is recrystallized from a mixture of 40 parts 2-propanol and 24 parts acetone. After cooling overnight at 0° C., 1 - (3 - cyano - 3,3 - diphenylpropyl) - 4 - [3 - (ethoxymethyl) - 2 - oxo - 1 - benzimidazolinyl]-piperidine hydrochloride is obtained, melting point 216.5–220° C., as a white, microcrystalline powder.

*Example XLVI*

A mixture of 110 parts 1-bromo-3,3-diphenylpropane, 78 parts 4 - (2 - oxo - 1 - benzimidazolinyl) - 1,2,3,6-tetrahydropyridine, 114 parts sodium carbonate, a few crystals of potassium iodide and 2000 parts 4 - methyl - 2-pentanone is stirred and refluxed for sixty hours. After cooling the reaction mixture is filtered and evaporated. The solid residue is washed with acetone, filtered off again and dried yielding 1-(3,3-diphenylpropyl)-4-(2-oxo-1-benzimidazolinyl) - 1,2,3,6 - tetrahydropyridine, melting point 148–149° C., as a grey-white amorphous powder.

After keeping the mother liquor for two days at −20° C., a second fraction is filtered off, washed with acetone and dried, yielding 1 - (3,3-diphenylpropyl)-4-(2-oxo-1-benzimidazolinyl) - 1,2,3,6 - tetrahydropyridine, melting point 1363.2–140.1° C.

*Example XLVII*

A mixture of 8.2 parts 1-(3,3-diphenylpropyl)-4-(2-oxo - 1-benzimidazolinyl)-piperidine hydrochloride, 22 parts formaline 37% and 60 parts 2-propanol is stirred and refluxed for twenty hours. The reaction mixture is filtered and evaporated. The oily residue is dissolved in a mixture of 80 parts acetone and 160 parts diisopropyl ether and gaseous hydrogen chloride is introduced into the solution. The precipitated solid hydrochloride is filtered off and dried, yielding 1-(3,3-diphenylpropyl)-4-(3-hydroxymethyl-2-oxo-1-benzimidazolinyl)-piperidine, melting point 263–265.2° C., as a white, microcrystalline powder.

*Example XLVIII*

A mixture of 4.6 parts 1-(3,3-diphenylpropyl)-4-(2-oxo - 1-benzimidazolinyl)-1,2,3,6-tetrahydropyridine, 12 parts formaline 37% and 20 parts 2-propanol is stirred and refluxed for twenty hours. The reaction mixture is filtered and after keeping the filtrate for forty-eight hours at room temperature, a precipitate is formed. It is filtered off and dried, yielding 3.1 parts product. This crop is dissolved in a boiling mixture of 40 parts acetone and 80 parts diisopropylether. This solution is filtered and gaseous hydrogen chloride is introduced into the filtrate. The precipitated solid hydrochloride is filtered off and dried, yielding 1 - (3,3-diphenylpropyl)-4-(3-hydroxymethyl-2-oxo - 1 - benzimidazolinyl)-1,2,3,6-tetrahydropyridine hydrochloride, melting point 235–236° C. (dec.), as a white, amorphous powder.

*Example XLIX*

To a stirred mixture of 5.21 parts 4-(3-chloro-methyl-2 - oxo - 1-benzimidazolinyl)-1-(3-cyano-3,3-diphenylpropyl)-piperidine hydrochloride in 56 parts methanol is added dropwise a sodium methoxide solution, prepared from 1.5 parts sodium in 24 parts methanol. After the addition is complete, the whole is stirred and refluxed for three hours. After cooling, the reaction mixture is evaporated. To the residue are added 50 parts water and 400 parts ether. The organic layer is dried over potassium carbonate, filtered and evaporated. The oily residue is dissolved in 48 parts diisopropylether. After cooling for two days at −15° C., 1.7 parts of the crude free base is filtered off. Then gaseous hydrogen chloride is introduced into the mother liquor. The precipitated hydrochloride is filtered off and dried for four hours at 100° C., yielding 1 - (3-cyano-3,3-diphenylpropyl)-4-(3-methoxymethyl - 2-oxo-1-benzimidazolinyl)-piperidine hydrochloride, melting point 153.6–160° C., as a white, granular powder.

*Example L*

A mixture of 7 parts 1-bromo-4,4-diphenyl-valeronitrile, 4.4 parts 4-(2-oxo-1-benzimidazolinyl)-piperidine, 3.2 parts sodium carbonate, a few crystals of potassium iodide in 200 parts 4-methyl-2-pentanone is stirred and refluxed for sixty hours. After cooling, a precipitate is formed. The whole is treated with 50 parts water and filtered. The filtrate is set aside. The solid precipitate is boiled in 80 parts acetone and filtered. After cooling the filtrate overnight at −20° C., 1-(4-cyano-4,4-diphenylbutyl)-4-(2-oxo-1-benzimidazolinyl)-piperidine is obtained, melting point 216.5–217.5° C., as a white amorphous powder.

From the filtrate, which was set aside, the organic layer is separated, dried over potassium carbonate and evaporated. The solid residue is triturated in 16 parts acetone, filtered off and dried, yielding 1-(4-cyano-4,4-diphenylbutyl) - 4-(2-oxo-1-benzimidazolinyl)-piperidine, melting point 198–208° C.

*Example LI*

To a stirred and refluxing solution of 4.3 parts 4-(2-oxo-1-benzimidazolinyl)-1,2,3,6-tetrahydro-pyridine, 3.18 parts sodium carbonate, a few crystals of potassium iodide in 100 parts 4-methyl-2-pentanone is added dropwise a solution of 6.7 parts 5-bromo-1,1-diphenyl-valeronitrile in 100 parts 4-methyl-2-pentanone. After the addition is complete, the mixture is stirred and refluxed for seventy-two hours. After cooling, 100 parts water are added. The organic layer is separated, dried over potassium carbonate, filtered and the filtrate is evaporated. The oily residue is boiled in 120 parts acetone. After cooling overnight at 0° C., the crude product is obtained. This crop is dissolved again in 64 parts acetone. After cooling this solution for three days at 0° C., the formed precipitate is filtered off, washed with ether and dried in vacuo for four hours at 70° C., to yield 1-(4-cyano-4,4-diphenylbutyl) - 4-(2-oxo-1-benzimidazolinyl)-1,2,3,6-tetrahydropyridine, melting point 177–179.5° C., brown granules.

*Example LII*

A mixture of 8 parts 1-chloro-5-cyano-5,5-diphenylpentane, 6.5 parts 4-(2-oxo-1-benzimidazolinyl)-piperidine, 15 parts potassium carbonate, a few crystals of potassium iodide in 280 parts 4-methyl-2-pentanone is stirred and refluxed for seventy-two hours. (The reaction-vessel is provided with reflux-condenser and water-separator.) After cooling, 200 parts water are added. The aqueous layer is separated and washed with ether. The combined organic phases are dried and evaporated in vacuo. The oily residue is dissolved in 80 parts warm acetone. To the hot solution is added a solution of 1 part oxalic acid dihydrate in 40 parts warm acetone. The whole is diluted with 80 parts ether, whereupon a precipitate is formed, yielding the crude product. This crop is dissolved in a mixture of 56 parts acetone and 160 parts methanol. The solution is concentrated to a volume of 70 parts and then there are added 56 parts acetone. After cooling to room temperature, 1-(5-cyano-5,5-diphenylpentyl) - 4-(2-oxo-1-benzimidazolinyl)-piperidine oxalate is obtained, melting point 233.5–234° C. (dec.). as a white granular powder.

*Example LIII*

A mixture of 10 parts 1-chloro-5-cyano-5,5-diphenylpentane, 8.76 parts 4-(2-oxo-1-benzimidazolinyl)-1,2,3,6-tetrahydro-pyridine, 15 parts sodium carbonate, a few crystals of potassium iodide in 280 parts n-butanol is stirred and refluxed for seventy-two hours. After cooling the reaction mixture is filtered and evaporated. The oily residue is dissolved in benzene. The solution is washed with water, treated with activated charcoal and evaporated. The oily residue is dissolved in 56 parts warm acetone. Then there are added 1.4 parts oxalic acid dihydrate dissolved in 56 parts warm acetone. The combined solutions are heated for a few minutes and then cooled to room temperature. The formed oxalate is filtered off, washed with warm acetone and filtered off again, yielding a first fraction of the crude product, and a second fraction of pure 1-(5-cyano-5,5-diphenyl-pentyl)-4-(2-oxo-1-benzimidazolinyl)-1,2,3,6-tetrahydro-pyridine oxalate, melting point 208–212° C., as a white amorphous powder.

After recrystallization of the first crude fraction from a mixture of 120 parts acetone and 40 parts benzene, the pure product 1(5-cyano-5,5-diphenyl-pentyl)-4-(2-oxo-1-benzimidazolinyl) - 1,2,3,6-tetrahydro-pyridine oxalate is obtained, melting point 178.5–198° C. (dec.).

Example LIV

A solution of 48.5 parts 4-chloro-1,1-diphenyl-1-butene in 400 parts 2-propanol is hydrogenated at normal pressure and at a temperature of about 30° C., in the presence of 5 parts palladium-on-charcoal catalyst 10%. After the calculated amount of hydrogen is taken up, hydrogenation is stopped. The catalyst is filtered off and the filtrate is evaporated. The oily residue is distilled in vacuo, yielding 1-chloro-4,4-diphenyl-butane, boiling point 180–185° C. at 2 mm. pressure, $n_D^{20}$: 1.5728; $d_{20}^{20}$: 1.0874.

To a stirring mixture of 4.4 parts 4-(2-oxo-1-benzimidazolinyl)-piperidine, 3.2 parts sodium carbonate, a few crystals of potassium iodide in 200 parts 4-methyl-2-pentanone are added portionwise 5.4 parts 1-chloro-4,4-diphenyl-butane. After the addition is complete, the whole is stirred and refluxed for sixty-five hours. After cooling, the reaction mixture is treated with 70 parts water while stirring. The remaining precipitate is filtered off and recrystallized from a mixture of 120 parts acetone and 120 parts 4-methyl-2-pentanone, yielding 1-(4,4-diphenyl-butyl) - 4 - (2-oxo-1-benzimidazolinyl)-piperidine, melting point 225–227° C.

Example LV

To a solution of 130 parts cyclopropyl-di-(4-fluorophenyl)-carbinol in 240 parts benzene are added dropwise 43 parts thionyl-chloride. The whole is refluxed until no more gas is evolved. The reaction mixture is then evaporated. The residue is distilled in vacuo, yielding 4-chloro-1,1-di-(4-fluoro-phenyl)-1-butene, boiling point 165–167° C. at 6 mm. pressure; $n_D^{20}$: 1.5698; $d_{20}^{20}$: 1.2151.

A solution of 61 parts 4-chloro-1,1-di-(4-fluoro-phenyl)-1-butene in 400 parts 2-propanol is hydrogenated at normal pressure and at room temperature in the presence of 5.5 parts palladium-on-charcoal catalyst 10% (exothermic reaction: temperature rises to about 30° C.). After the calculated amount of hydrogen is taken up, hydrogenation is stopped. The catalyst is filtered off and the filtrate is evaporated. The oily residue is distilled is vacuo, yielding 1-chloro-4,4-di-(4-fluoro-phenyl)-butane, boiling point 166–168° C. at 6 mm. pressure; $n_D^{20}$: 1.5425; $d_{20}^{20}$:1.2039.

To a mixture of 4.4 parts 4-(2-oxo-1-benzimidazolinyl)-piperidine, 3.3 parts sodium carbonate, a few crystals of potassium iodide in 200 parts 4-methyl-2-pentanone are added portionwise 6.2 parts 1-chloro-4,4-di-(4-fluorophenyl)-butane. After the addition is complete, the whole is stirred and refluxed for sixty-five hours. After cooling the reaction mixture, there are added seventy parts water. The organic layer is separated, dried over potassium carbonate, filtered and evaporated. The solid residue is triturated in diisopropyl-ether, filtered off again and recrystallized from a mixture of 120 parts acetone and 80 parts 4-methyl-2-pentanone, yielding the crude product. After recrystallization of this crop from 80 parts acetone, 1-[4,4-di-(4-fluoro-phenyl)-butyl]-4-(2-oxo-1-benzimidazolinyl)-piperidine is obtained, melting point 217–219° C.

Example LVI

Starting from 36 parts magnesium and 263 parts 4-fluoro-bromobenzene, a solution of 4-fluoro-phenyl-magnesium bromide in 280 parts anhydrous tetrahydrofurane is prepared in the usual manner. To this solution is added a solution of 220 parts cyclopropyl phenyl ketone in 120 parts anhydrous tetrahydrofurane (exothermic reaction: the reflux temperature is reached). The whole is further stirred and refluxed for two hours. The reaction mixture is cooled to room temperature and decomposed with water, while keeping a temperature below 20° C. The mixture is then extracted with benzene and ether. The organic extracts are dried over magnesium sulfate, filtered and evaporated. The oily residue is distilled in vacuo, yielding dl-cyclopropyl-4-fluorophenyl-phenyl-carbinol, boiling point 170–175° C. at 6 mm. pressure.

To a stirred mixture of 200 parts dl-cyclopropyl-4-fluoro-phenyl-phenyl-carbinol in 360 parts anhydrous benzene are added dropwise 120 parts thionylchloride (exothermic reaction). After the addition is complete, the whole is stirred and refluxed for one and a half hours. The reaction mixture is evaporated. The oily residue is fractionated in vacuo, yielding 4-chloro-1-(4-fluorophenyl)-1-phenyl-1-butene, boiling point 153–158° C. at 1.2 mm. pressure.

A mixture of 90 parts 4-chloro-1-(4-fluorophenyl)-1-phenyl-1-butene, 440 parts 2-propanol and 40 parts distilled water is hydrogenated at normal pressure and at a temperature of about 35° C., in the presence of 10 parts palladium-on-charcoal catalyst. After the calculated amount of hydrogen is taken up, hydrogenation is stopped. The whole is boiled for a few minutes. The catalyst is filtered off and the filtrate is evaporated. The oily residue is distilled in vacuo, yielding a first fraction of less pure dl-1-chloro-4(4-fluorophenyl)-4-phenyl-butane, boiling point 135–145° C. at 0.2 mm. pressure and a second fraction of pure dl-1-chloro-4-(fluorophenyl)-4-phenyl-butane, boiling point 145–150° C. at 0.2 mm. pressure; $n_D^{20}$: 1.5578; $d_{20}^{20}$: 1.1447.

(A) A mixture of 5.8 parts dl-1-chloro-4-(4-fluorophenyl)-4-phenyl-butane, 4.4 parts 4-(2-oxo-1-benzimidazolinyl)-piperidine, 3.2 parts sodium carbonate, a few crystals of potassium iodide in 200 parts 4-methyl-2-pentanone is stirred and refluxed for sixty-five hours. After cooling the reaction mixture, there are added 70 parts water. The precipitated solid is filtered off, washed successively with water and 4-methyl-2-pentanone and dried, yielding a first fraction of dl-1-[4-(4-fluorophenyl)-4 - phenyl-butyl]-4-(2-oxo-1-benzimidazolinyl) _ piperidine, melting point 218–219.5° C.

From the filtrate the organic layer is separated, dried over potassium carbonate, filtered and evaporated. The solid residue is triturated in 80 parts acetone and the whole is boiled for a few minutes. After cooling to room temperature, the solid is filtered off and dried, yielding a second fraction of dl-1-[4-(4-fluorophenyl)-4-phenyl-butyl]-4-(2-oxo-1-benzimidazolinyl) - piperidine, melting point 213–214 C.

(B) To a stirred mixture of 4.3 parts 4-(2-oxo-1-benzimidazolinyl)-1,2,3,6-tetrahydro-pyridine, 3.2 parts sodium carbonate, a few crystals of potassium iodide in 160 parts 4-methyl-2-pentanone is added dropwise a solution of 5.8 parts dl-1-chloro-4-(4-fluorophenyl)-4-phenyl-butane in 40 parts 4-methyl-2-pentanone. After the addition is complete, the whole is further stirred and refluxed for sixty-five hours. After cooling the reaction mixture, there are added 50 parts water. The organic layer is separated, dried over potassium carbonate, filtered and evaporated. The oily residue is dissolved in 80 parts boiling acetone. This solution is filtered hot and to the warm filtrate is added a warm solution of 2.6 parts oxalic acid dihydrate in 32 parts acetone. After cooling to room temperature, the precipitated oxalate is filtered off and dried, yielding dl-1-[4-(4-fluorophenyl)-4-phenyl-butyl]-4-(2-oxo-1-benzimidazolinyl) - 1,2,3,6-tetrahydro-pyridine oxalate, melting point 218–221° C.

Example LVII

To a solution of 3-(trifluoromethyl)-phenyl-magnesiumbromide, prepared from 12 parts magnesium and 117 parts 3-(trifluoromethyl)-phenyl-magnesiumbromide in 176 parts anhydrous ether, is added dropwise a solution of 82 parts cyclopropyl-4-fluorophenyl-ketone in 80 parts anhydrous ether (exothermic reaction: reflux temperature is reached). After the addition is complete, the whole is further stirred and refluxed for another two hours. After cooling, the reaction mixture is decomposed with ammonium chloride solution 25% at a temperature below 20° C. and then extracted with ether. The organic extract is dried over potassium carbonate, filtered and evaporated. The oily residue is distilled in vacuo, yielding dl-cyclopropyl - 4 - fluorophenyl-3-trifluoro-methyl-phenyl-carbinol, boiling point 145–150° C. at 1.5–2 mm. pressure.

To a solution of 103.4 parts dl-cyclopropyl-4-fluoro-phenyl-3-trifluoromethylphenyl-carbinol in 160 parts anhydrous benzene are added dropwise 48 parts thionyl-chloride (exothermic reaction: temperature rises to about 40° C.). After the addition is complete, the whole is further stirred and refluxed for three hours and thirty minutes. The reaction mixture is filtered and the filtrate is evaporated. The oily residue is distilled in vacuo, yielding 4 - chloro - 1 - (4 - fluorophenyl) - 1 - (3 - trifluoromethylphenyl)-1-butene, boiling point 140–145° C. at 0.8 mm. pressure, $n_D^{20}$: 1.5355; $d_{20}^{20}$: 1.2750.

A mixture of 82 parts 4-chloro-1-(4-fluorophenyl)-1-(3-trifluoromethylphenyl)-1-butene and 320 parts 2-propanol is hydrogenated at normal pressure and at room temperature in the presence of 5 parts palladium-on-charcoal catalyst 10%. After the calculated amount of hydrogen is taken up, hydrogenation is stopped. The catalyst is filtered off and the filtrate is evaporated. The oily residue is fractionated, yielding dl-1-chloro-4-(4-fluorophenyl) - 4 - (3 - trifluoromethylphenyl) - butane, boiling point 140–145° C. at 0.6 mm. pressure, $n_D^{20}$: 1.5132; $d_{20}^{20}$: 1.2642.

To a mixture of 4.4 parts 4-(2-oxo-1-benzimidazolinyl)-piperidine, 3.2 parts sodium carbonate, a few crystals of potassium iodide in 160 parts 4-methyl-2-pentanone is added dropwise a solution of 7.4 parts dl-1 - chloro - 4 - (4 - fluorophenyl) - 4 - (3 - trifluoromethylphenyl)-butane in 40 parts 4-methyl-2-pentanone. After the addition is complete, the whole is stirred and refluxed for sixty-five hours. After cooling the reaction mixture, 50 parts water are added. The organic layer is separated, dried over potassium carbonate, filtered and evaporated. The oily residue is dissolved in a boiling mixture of 48 parts 2-propanol and 48 parts acetone and the solution is filtered hot. To this hot filtrate is added a warm solution of 2.6 parts oxalic acid dihydrate in a mixture of 20 parts 2-propanol and 20 parts acetone. After cooling to room temperature, the precipitated solid oxalate is filtered off and recrystallized from a mixture of 60 parts 2-propanol and 15 parts water, yielding a first fraction of dl-1-[4-(4-fluorophenyl)-4-(3-trifluoromethylphenyl) - butyl] - 4 - (2 - oxo - 1 - benzimidazolinyl)-piperidine oxalate, melting point 220–221° C. and a second fraction of dl-1-[4-(4-fluorophenyl)-4-(3-trifluoromethylphenyl) - butyl] - 4 - (2 - oxo - 1 - benzimidazolinyl)-piperidine oxalate, melting point 216–217° C.

Example LVIII

To a solution of 4-methoxy-phenyl-magnesiumbromide, prepared in the usual manner starting from 14.6 parts magnesium and 118 parts 4-methoxy-bromo-benzene in 200 parts anhydrous ether, is added dropwise a solution of 88 parts cyclopropyl phenyl ketone in 120 parts anhydrous ether. After the addition is complete, the whole is further stirred and refluxed for one and a half hours. After cooling the reaction mixture is decomposed by successive addition of 40 parts ammonium chloride and 100 parts water. The solvent is decanted from the precipitated matter (which is set aside), washed with water. The precipitate is dissolved in water, saturated with potassium carbonate and extracted with ether (three times with 80 parts). The combined organic layers are dried over potassium carbonate, filtered and evaporated. The oily residue is distilled in vacuo, yielding dl-cyclopropyl-4-methoxyphenyl-phenyl-carbinol, boiling point 150–180° C. at 1.5 mm. pressure, $n_D^{20}$: 1.5890; $d_{20}^{20}$: 1.1417.

To a solution of 86 parts dl-cyclopropyl-4-methoxy-phenyl-phenyl-carbinol in 200 parts anhydrous benzene are added dropwise 60 parts thionylchloride (exothermic reaction). After the addition is complete, the whole is stirred and refluxed for one hour. The reaction mixture is evaporated. The residue is dissolved in benzene and this solution is evaporated again. This treatment is repeated three times. The oily residue is distilled in vacuo, yielding 4 - chloro - 1 - (4 - methoxyphenyl) - 1 - phenyl-1-butene, boiling point 165–183° C. at 0.5 mm. pressure.

A solution of 49 parts 4-chloro-1-(4-methoxyphenyl)-1-phenyl-1-butene in 80 parts methanol and 160 parts 2-propanol is hydrogenated at normal pressure and at room temperature, in the presence of 5 parts palladium-on-charcoal catalyst 10%. After the calculated amount of hydrogen is taken up, hydrogenation is stopped. The catalyst is filtered off and the filtrate is evaporated. The oily residue is distilled in vacuo, yielding dl-1-chloro-4-(4-methoxyphenyl)-4-phenyl-butane, boiling point 146–155° C. at 0.2–0.3 mm. pressure.

A mixture of 6.03 parts dl-1-chloro-4-(4-methoxy-phenyl)-4-phenyl-butane, 5.1 parts 4-(2-oxo-1-benzimidazolinyl)-piperidine, 5.3 parts sodium carbonate, a few crystals of potassium iodide in 200 parts 4-methyl-2-pentanone is stirred and refluxed for seventy hours. After cooling, there are added 80 parts water. The organic layer is separated, dried over potassium carbonate, filtered and evaporated. The solid residue is triturated in 160 parts acetone, filtered off again and washed with acetone and dried in vacuo, yielding dl-1-[4-(4-methoxy-phenyl)-4 - phenyl - butyl] - 4 - (2 - oxo - 1 - benzimidazolinyl)-piperidine, melting point 177–178° C.

Example LIX

To a solution of 4-fluorophenyl-magnesiumbromide, prepared in the usual manner starting from 12.2 parts magnesium and 96.2 parts 4-fluoro-bromobenzene in 240 parts anhydrous ether, is added dropwise a solution of 80 parts cyclopropyl-4-methylphenyl-ketone in 240 parts anhydrous ether (exothermic reaction: reflux-temperature is maintained). After the addition is complete, the whole is further stirred and refluxed for another three hours. The reaction mixture is decomposed with 1000 parts ammonium chloride. The so obtained emulsion is filtered and from the filtrate is separated the aqueous layer and extracted twice more with 240 parts ether. The combined etheric layers are dried over sodium sulfate and evaporated. The oily residue is distilled in vacuo, yielding dl-cyclopropyl-4-fluorophenyl-4-methyl - phenyl-carbinol, boiling point 130–135° C. at 0.4 mm. pressure.

To a solution of 79 parts dl-cyclopropyl-4-fluoro-phenyl-4-methylphenyl-carbinol in 160 parts anhydrous benzene are added portionwise 40 parts thionylchloride (exothermic reaction: temperature rises from 15° to 50° C.). The mixture is cooled in an ice-bath and the addition is continued. After the addition is complete, the whole is stirred and refluxed one and a half an hour. The solvent is evaporated and the oily residue is distilled in vacuo, yielding 4-chloro-1-(4-fluorophenyl)-1-(4- methyl-phenyl)-1-butene, boiling point 164–167° C. at 2 mm. pressure, $n_D^{20}$: 1.5809.

A solution of 43 parts 4-chloro-1-(4-fluoro-phenyl)-1-(4-methyl-phenyl)-1-butene in 120 parts 2-propanol is hydrogenated at normal pressure and at room temperature, in the presence of 4 parts palladium-on-charcoal catalyst. After the calculated amount of hydrogen is taken up, hydrogenation is stopped. The catalyst is filtered off and the filtrate is evaporated. The oily residue is distilled in vacuo, yielding dl-1-chloro-4-(4-fluoro-phenyl)-4-(4-methyl-phenyl)-butane, boiling point 132–137° C. at 0.2–0.3 mm. pressure, $n_D^{20}$: 1.5550; $d_{20}^{20}$: 1.1324.

To a stirred and refluxing mixture of 5.6 parts 4-(2-oxo-1-benzimidazolinyl)piperidine hydrochloride, 9.3 parts sodium carbonate, a few crystals of potassium iodide in 136 parts 4-methyl-2-pentanone is added dropwise a solution of 7.2 parts dl-1-chloro-4-(4-fluoro-phenyl)-4-(4-methyl-phenyl)-butane in 24 parts 4-methyl-2-pentanone. After the addition is complete, the whole is further stirred and refluxed for forty-eight hours. After cooling, there are added 150 parts water. The organic layer is separated, dried over potassium carbonate and evaporated. The solid residue is recrystallized from 72 parts 4-methyl-2-pentanone. After cooling overnight at 0° C., the formed precipitate is filtered off and dried in vacuo, yielding crude dl-1-[4-(4-fluoro-phenyl) - 4 - (4-methyl-phenyl)-butyl] - 4 - (2 - oxo - 1 - benzimidazolinyl)-piperidine. This crop is recrystallized once more from 72 parts 4-methyl-2-pentanone. After cooling overnight at room temperature, dl-1-[4-(4-fluoro-phenyl)-4-(4-methyl-phenyl)-butyl]-4-(2-oxo-1-benzimidazolinyl)-piperidine is obtained, melting point 209.5°–213° C.

*Example LX*

To a solution of 3-trifluoromethyl-phenyl-magnesium-bromide, prepared from 13 parts magnesium, 125 parts 3-bromo-benzotrifluoride in 480 parts anhydrous ether, is added dropwise a solution of 73 parts cyclopropyl-phenyl-ketone in 400 parts anhydrous ether (exothermic reaction: the reflux temperature is maintained). After the addition is complete, the whole is further stirred and refluxed for one hour. The reaction mixture is cooled into ice water. The whole is decomposed with ammonium chloride solution. The organic layer is separated, dried over magnesium sulfate and evaporated. The oily residue is distilled in vacuo, yielding dl-cyclopropyl-phenyl-3-trifluoromethyl-phenyl-carbinol, boiling point 144–146° C. at 2.5 mm. pressure.

To a solution of 10.5 parts dl-cyclopropyl-phenyl-3-trifluoromethylphenyl-carbinol in 200 parts anhydrous benzene are added dropwise 60 parts thionylchloride, while heating the whole to a temperature of 50° C. After the addition is complete, the whole is further stirred and refluxed for eight hours. The solvent is evaporated and the oily residue is distilled in vacuo, yielding 4-chloro-1-phenyl-1-(3-trifluoromethylphenyl) - 1 - butene, boiling point 138–139° C. at 0.6 mm. pressure, $n_D^{20}$: 1.5470, $d_{20}^{20}$: 1.2255.

A solution of 31 parts 4-chloro-1-phenyl-1-(3-trifluoromethyl-phenyl)-1-butene in 160 parts 2-propanol is hydrogenated at normal pressure and at a temperature of about 30° C., in the presence of 3 parts palladium-on-charcoal catalyst 10%. After the calculated amount of hydrogen is taken up, hydrogenation is stopped. The catalyst is filtered off and the filtrate is evaporated. The oily residue is distilled in vacuo, yielding dl-1-chloro-4-phenyl-4-(3-trifluoromethyl-phenyl)-butane, boiling point 160–162° C. at 1.5 mm. pressure, $n_D^{20}$: 1.5220, $d_{20}^{20}$: 1.2125.

A mixture of 7 parts dl-1-chloro-4-phenyl-4-(3-trifluoromethyl-phenyl)-butane, 5.1 parts 4-(2-oxo-1-benzimidazolinyl)-piperidine hydrochloride, 6.3 parts sodium carbonate, a few crystals of potassium iodide in 200 parts 4-methyl-2-pentanone is stirred and refluxed for sixty hours. After cooling the reaction mixture there are added 100 parts water. The organic layer is separated, dried over potassium carbonate and evaporated. The solid residue is recrystallized from 60 parts 4-methyl-2-pentanone, yielding dl-4-(2-oxo-1-benzimidazolinyl) - 1 - [4-phenyl-4-(3-trifluoromethyl-phenyl) - butyl] - piperidine, melting point 145.5–146.5° C.

*Example LXI*

To a solution of phenyl-magnesiumbromide, prepared in the usual manner starting from 20.5 parts magnesium and 141.3 parts bromo-benzene in 400 parts anhydrous ether, is added dropwise a solution of 65.8 parts ethyl 5-chloro-valerate, while refluxing. After the addition is complete, the whole is further stirred and refluxed for another four hours. After cooling the reaction mixture is decomposed with an ammoniumchloride solution. The aqueous layer is separated and extracted with ether. The organic layers are dried over sodium sulfate, filtered and evaporated. The oily residue is dissolved in 240 parts petroleum ether and this solution is stirred for 1 hour in an ice-salt-bath, whereupon a solid is precipitated. It is filtered off and dried in an exsiccator, to yield 5-chloro-1,1-diphenyl-pentanol, melting point 58–61° C.

A solution of 50 parts 5-chloro-1,1-diphenyl-pentanol in 300 parts concentrated hydrochloric acid is stirred and refluxed for five hours. After cooling, the reaction mixture is extracted with ether. The organic layer is dried over calcium chloride, filtered and evaporated. The oily residue is distilled in vacuo, yielding 5-chloro-1,1-diphenyl-1-pentene, boiling point 150–165° C. at 1.5 mm. pressure.

A solution of 25.6 parts 5-chloro-1,1-diphenyl-1-pentene in 200 parts 2-propanol is hydrogenated at normal pressure and at a temperature of about 30° C. in the presence of 5 parts palladium-on-charcoal catalyst 10%. After the calculated amount of hydrogen is taken up, hydrogenation is stopped. The catalyst is filtered off and the filtrate is evaporated. The oily residue is distilled in vacuo, yielding 1-chloro-5,5-diphenyl-pentane, boiling point 130–144° C. at 0.2 mm. pressure.

A mixture of 5.7 parts 1-chloro-5,5-diphenyl-pentane, 5.3 parts 4-(2-oxo-1-benzimidazolinyl)-piperidine hydrochloride, 5.3 parts sodium carbonate, a few crystals of potassium iodide in 200 parts 4-methyl-2-pentanone is stirred and refluxed for sixty-five hours. After cooling the reaction mixture, there are added 50 parts water. The organic layer is separated, dried over potassium carbonate, filtered and evaporated. The oily residue is dissolved in a mixture of 120 parts acetone and 20 parts 2-propanol. This solution is filtered hot and then there are added a solution of 2.6 parts oxalic acid dihydrate in 40 parts acetone. After cooling overnight at −20° C., the precipitated oxalate is filtered off, washed with acetone and dried, yielding 1-(5,5 - diphenyl-pentyl)-4-(2-oxo-1-benzimidazolinyl)-piperidine oxalate, melting point 133–191° C. (dec.).

*Example LXII*

To a solution of 4-methyl-phenyl-magnesiumbromide, prepared from 12.2 parts magnesium, 102.6 parts 4-methyl-bromo-benzene and 320 parts anhydrous ether in the usual manner, is added dropwise a solution of 73 parts cyclopropyl-phenyl-ketone in 320 parts anhydrous ether, while refluxing. After the addition is complete, the whole is further stirred and refluxed for another three hours. After cooling the reaction mixture is decomposed with 1500 parts of a saturated ammoniumchloride solution. The organic layer is separated, dried over magnesium sulfate, filtered and evaporated. The oily residue is distilled in vacuo, yielding dl-cyclopropyl-4-methyl-phenyl-phenyl-carbinol, boiling point 131–134° C. at 0.4 mm. pressure, $n_D^{20}$: 1.5795.

To a solution of 45 parts dl-cyclopropyl-4-methyl-phenyl-phenyl-carbinol in 80 parts anhydrous ether are added portionwise 16 parts thionylchloride (exothermic reaction: temperature rises to 60° C.). After the addition is complete, the whole is stirred and refluxed for one hour and a half. The solvent is evaporated. The residue is dissolved in 160 parts toluene and evaporated again. The oily residue is distilled in vacuo, yielding 4-chloro-1-(4-methyl-phenyl)-1-phenyl-1-butene, boiling point 164–165° C. at 1.4 mm. pressure, $n_D^{20}$: 1.5955.

A solution of 28 parts 4-chloro-1-(4-methyl-phenyl)-1-phenyl-1-butene in 120 parts 2-propanol is hydrogenated at normal pressure and at room temperature in the presence of 4 parts palladium-on-charcoal catalyst. After the calculated amount of hydrogen is taken up, hydrogenation is stopped. The catalyst is filtered off and the filtrate is evaporated. The oily residue is distilled in vacuo, yielding dl-1-chloro-4-(4-methyl-phenyl)-4-phenyl-butane, boiling point 140–142° C. at 0.3 mm. pressure.

To a stirred and refluxing mixture of 5.6 parts 4-(2-oxo-1-benzimidazolinyl)-piperidine hydrochloride, 9.3 parts sodium carbonate, a few crystals of potassium iodide in 136 parts 4-methyl-2-pentanone is added dropwise a solution of 6.7 parts dl-1-chloro-4-(4-methyl-phenyl)-4-phenyl-butane in 24 parts 4-methyl-2-pentanone. After the addition is complete, the whole is stirred and refluxed for another forty-eight hours. After cooling there are added 150 parts water. The undissolved part is filtered off and recrystallized twice from 40 parts 4-methyl-2-pentanone. After cooling overnight at 0° C., dl-1-[4-(4-methyl-phenyl) - 4 - phenyl-butyl] - 4 - (2-oxo-1-benzimidazolinyl)-piperidine is obtained, melting point 213–215° C.

Example LXIII

To a solution of 4-fluorobenzyl-magnesiumchloride, prepared in the usual manner starting from 24 parts magnesium and 145 parts 4-fluoro-benzylchloride in 160 parts anhydrous ether, is added dropwise a solution of 164 parts cyclopropyl-4-fluorophenyl-ketone in 240 parts anhydrous ether. After the addition is complete, the whole is stirred and refluxed for one hour. After cooling the reaction mixture is decomposed with an ammoniumchloride solution and extracted with ether. The organic layer is separated, dried over potassium carbonate, filtered and evaporated. The oily residue is distilled in vacuo, yielding a crude product. This fraction is redistilled whereafter two fractions are obtained: a first fraction of dl-1-cyclopropyl-1,2-di-(4-fluoro-phenyl)-ethanol, boiling point 120–128° C. at 0.09 mm. pressure and a second fraction of dl-1-cyclopropyl-1,2-di-(4-fluoro-phenyl)-ethanol, boiling point 140–145° C. at 0.6 mm. pressure.

To a solution of 145 parts dl-1-cyclopropyl-1,2-di-(4-fluoro-phenyl)-ethanol in 320 parts anhydrous benzene are added portionwise 134 part thionylchloride. After the addition is complete the whole is stirred and refluxed for eight hours. After cooling the solvent is evaporated. The oily residue is distilled in vacuo, yielding 5-chloro-1,2-di-(4-fluoro-phenyl)-2-pentene, boiling point 144–146° C., at 0.6 mm. pressure.

A solution of 33 parts 5-chloro-1,2-di-(4-fluoro-phenyl)-2-pentene in 240 parts methanol is hydrogenated at normal pressure and at a temperature of about 35–40° C., in the presence of 5 parts palladium-on-charcoal catalyst 10%. After the calculated amount of hydrogen is taken up, hydrogenation is stopped. The catalyst is filtered off and the filtrate is evaporated. The oily residue is distilled in vacuo, yielding dl-1-chloro-4,5-di-(4-fluoro-phenyl)-pentane, boiling point 114–129° C. at 0.1 mm. pressure.

A mixture of 7.25 parts dl-1-chloro-4,5-di-(4-fluoro-phenyl)-pentane, 4.35 parts 4-(2-oxo-1-benzimidazolinyl)-piperidine hydrochloride, 4.2 parts sodium carbonate, a few crystals of potassium iodide in 200 parts 4-methyl-2- pentanone is stirred and refluxed for sixty-five hours. After cooling, there are added 100 parts water. The organic layer is separated, dried over potassium carbonate, filtered and evaporated. The oily residue is dissolved in 120 parts acetone. To this boiling solution is added a hot solution of 2.2 parts oxalic acid dihydrate in 40 parts acetone. The whole is further boiled for a few minutes and after cooling to room temperature, the precipitated oxalate is filtered off, yielding dl-1-[4,5-di-(4-fluoro-phenyl)-pentyl]-4-(2-oxo-1-benzimidazolinyl) - piperidine oxalated, melting point 217.5° C. dec.).

Example LXIV

To a solution of 4-fluoro-benzyl-magnesiumchloride, prepared in the usual manner starting from 24 parts magnesium and 145 parts 4-fluoro-benzylchloride in 320 parts anhydrous ether, is added dropwise a solution of 146 parts cyclopropyl-phenyl-ketone in 160 parts anhydrous ether. After the addition is complete, the whole is stirred and refluxed for one hour. After cooling the reaction mixture is decomposed with 300 parts of a 20% ammonium chloride solution (exothermic reaction) and extracted with ether. The organic layers are dried over sodium sulfate, filtered and evaporated. The residue is distilled in vacuo, yielding dl-1-cyclopropyl-2-(4-fluoro-phenyl)-1-phenyl-ethanol, boiling point 160–170° C. at 0.8 mm. pressure.

To a solution of 108 parts dl-1-cyclopropyl-2-(4-fluoro-phenyl)-1-phenyl-ethanol in 350 parts benzene are added portionwise 100 parts thionylchloride (slightly exothermic reaction; the temperature rises to 35° C.). After the addition is complete, the whole is stirred and refluxed for ten hours. The dark coloured reaction mixture is evaporated. The oily residue is distilled in vacuo, yielding a first fraction of 5-chloro-1-(4-fluoro-phenyl)-2-phenyl-2-pentene, boiling point 165–170° C. at 0.4 mm. pressure and a second fraction of 5-chloro-1-(4-fluoro-phenyl)-2-phenyl-2-pentene, boiling point 170–172° C. at 0.4 mm. pressure.

A solution of 22 parts 5-chloro-1-(4-fluoro-phenyl)-2-phenyl-2-pentene in 160 parts 2-propanol is hydrogenated at normal pressure and at a temperature of about 40° C., in the presence of 3 parts palladium-on-charcoal catalyst 10%. After the calculated amount of hydrogen is taken up, hydrogenation is stopped. The catalyst is filtered off and the filtrate is evaporated. The oily residue is distilled in vacuo, yielding dl-1-chloro-5-(4-fluoro-phenyl)-4-phenyl-pentane, boiling point 145–150° C. at 0.8 mm. pressure.

A mixture of 6.2 parts dl-1-chloro-5-(4-fluoro-phenyl)-4-phenyl-pentane, 5.1 parts 4-(2-oxo-1-benzimidazolinyl)-piperidine hydrochloride, 5.3 parts sodium carbonate, a few crystals of potassium iodide in 200 parts 4-methyl-2-pentanone is stirred and refluxed for seventy hours. After cooling the reaction mixture, there are added 100 parts water. The organic layer is separated, dried over potassuim carbonate, filtered and evaported. The oily residue is dissolved in a mixture of 120 parts acetone and 24 parts 2-propanol. The solution is filtered and to the hot filtrate is added a warm solution of 2.6 parts oxalic acid dihydrate in 40 parts acetone. After cooling to room temperature for three hours, the precipitated oxalate is filtered off and dried for two days at 70° C., yielding dl-1-[5-(4-fluoro-phenyl) 4-phenyl-pentyl]-4-(2 - oxo - 1 - benzimidazolinyl)-piperidine oxalate, melting point 215–217° C.

Example LXV

To a solution of 4-fluoro-phenyl-magnesiumbromide, prepared in the usual manner starting from 26.5 parts magnesium and 210 parts 4-fluoro-bromo-benzene in 320 parts anhydrous ether, is added dropwise a solution of 83 parts ethyl-5-chloro-valerate in 320 parts anhydrous ether, while refluxing. After the addition is complete, the whole is further stirred and refluxed for another three hours. After cooling the reaction mixture is decomposed with a saturated solution of ammoniumchloride and then extracted with ether. The organic layer is dried over potassium carbonate, filtered and evaporated. The oily residue is poured into 400 parts petroleum ether and on scratching a solid precipitate is formed. It is filtered off and dried in an exsiccator, to yield 5-chloro-1, 1-di-(4-fluoro-phenyl)-pentanol, melting point 50–55° C.

A mixture of 6.8 parts 5-chloro-1,1-di-(4-fluoro-phenyl)-pentanol, 5.1 parts 4-(2-oxo-1-benzimidazolinyl)-piperidine hydrochloride, 5.3 parts sodium carbonate, a few crystals of potassium iodide in 200 parts 4-methyl-2-pentanone is stirred and refluxed for seventy hours. After cooling the reaction mixture, there are added 100 parts water. The organic layer is separated, dried over potassium carbonate, filtered and evaporated. The oily residue is dissolved in a mixture of 80 parts diisopropylether and 40 parts acetone and the whole is evaporated again in the cold. The solid residue is recrystallized from 120 parts 4-methyl-2-pentanone. After cooling to −20° C., the solid is filtered off and dried in vacuo, yielding 1-[5,5-di-(4-fluoro-phenyl)-5-hydroxy-pentyl]-4-(2-oxo-1 - benzimidazolinyl)-piperidine, melting point 105–111° C.

*Example LXVI*

A solution of phenylmagnesiumbromide is prepared in the usual manner from 6 parts magnesium and 40 parts bromobenzene in 160 parts ether. It is refluxed for two hours. Then a solution of 29 parts 2-chloro-propiophenone in 400 parts anhydrous ether is added dropwise, at room temperature. The whole is refluxed for six hours. After keeping overnight, the reaction mixture is decomposed with a 10% solution of ammoniumchloride at a temperature of <10° C. The ether is decanted, washed with water, dried over calciumchloride, filtered and evaporated. The residue is treated with ether and evaporated. The residue is then treated with petroleumether and evaporated. After three hours a solid residue is obtained. It is triturated in petroleumether, filtered and dried, yielding a crude product. This crop is dissolved in a mixture of 60 parts petroleumether and 24 parts acetone, filtered and evaporated, to yield 3-chloro-1,1-diphenyl-propanol, melting point 77.4–78.6° C.

A mixture of 5.4 parts 3-chloro-1,1-diphenyl-propanol, 4.3 parts 4-(2-oxo-1-benzimidazolinyl)-1,2,3,6-tetrahydropyridine, 3.2 parts sodium carbonate, a few crystals of potassium iodide in 200 parts 4-methyl-2-pentanone is stirred and refluxed for seventy-two hours. After cooling, 100 parts water are added. The organic layer is separated, dried over potassium carbone, filtered and evaporated. The residue is recrystallized from 120 parts acetone. The whole is filtered and after cooling the filtrate overnight at 0° C., 1-(3,3-diphenyl-3-hydroxy-propyl) - 4 - (2-oxo-1-benzimidazolinyl)-1,2,3,6-tetrahydropyridine, melting point 202–205.5° C., pale-brown, granular powder.

*Example LXVII*

To a solution of 4-fluoro-phenyl-magnesiumbromide, prepared in the usual manner, starting from 7.72 parts magnesium and 52.5 parts 4-fluoro-bromo-benzene in 200 parts anhydrous ether, is added dropwise a solution of 50 parts 4-benzoyl-1-chloro-butane in 200 parts anhydrous ether, while refluxing. After the addition is complete, the whole is further stirred and refluxed for another four hours. After cooling the reaction mixture is decomposed with an ammoniumchloride solution. The organic layer is separated and dried over sodium sulfate, filtered and evaporated. The oily residue is distilled in vacuo, yielding dl - 5-chloro-1-(4-fluoro-phenyl)-1-phenyl-pentanol, boiling point 170–175° C. at 0.8 mm. pressure.

A mixture of 6.5 parts dl-5-chloro-1-(4-fluoro-phenyl)-1-phenyl-propanol, 5.1 parts 4-(2-oxo-1-benzimidazolinyl)-piperidine hydrochloride, 5.3 parts sodium carbonate, a few crystals of potassium iodide in 200 parts 4-methyl-2-pentanone is stirred and refluxed for seventy hours. After cooling the reaction mixture, there are added 100 parts water. The organic layer is separated, dried over potassium carbonate and evaporated. The residue is recrystallized from 120 parts 4-methyl-2-pentanone and filtered. After cooling the filtrate overnight at −20° C., 7 parts product are filtered off. This crop is dissolved in 120 parts boiling acetone. To this hot solution is added a warm solution of 2.6 parts oxalic acid dihydrate in 24 parts acetone. After cooling overnight at room temperature, the precipitated oxalate is filtered off and dried, yielding dl - 1-[5-(4-fluoro-phenyl)-5-hydroxy-5-phenylpentyl]-4-(2-oxo-1-benzimidazolinyl)-piperidine oxalate, melting point 143°→190° (dec.).

*Example LXVIII*

A mixture of 46 parts dl-5-chloro-1-(4-fluoro-phenyl)-1-phenyl-pentanol and 300 parts concentrated hydrochloric acid is stirred and boiled for five hours. After cooling the reaction mixture is extracted with ether. The organic layer is dried over calcium chloride, filtered and evaporated and the oily residue is distilled in vacuo, yielding 5-chloro-1-(4-fluoro-phenyl)-1-phenyl-1-pentene, boiling point 150–160° C. at 0.6 mm. pressure.

A solution of 15 parts 5-chloro-1-(4-fluoro-phenyl)-1-phenyl-1-pentene and 160 parts 2-propanol is hydrogenated at normal pressure and at room temperature, in the presence of 2.5 parts palladium-on-charcoal catalyst. After the calculated amount of hydrogen is taken up, hydrogenation is stopped. The catalyst is filtered off and the filtrate is evaporated. The oily residue is distilled in vacuo, yielding dl-1-chloro-5-(4-fluoro-phenyl)-5-phenylpentane, boiling point 155–157° C. at 0.6 mm. pressure.

A mixture of 6.1 parts dl-1-chloro-5-(4-fluoro-phenyl)-5-phenyl-pentane, 5.1 parts 4-(2-oxo-1-benzimidazolinyl)-piperidine hydrochloride, 5.3 parts sodium carbonate, a few crystals of potassium iodide in 200 parts 4-methyl-2-pentanone is stirred and refluxed for sixty-five hours. After cooling there are added 50 parts water. The organic layer is separated, dried over potassium carbonate, filtered and evaporated. The residue is dissolved in a boiling mixture of 100 parts acetone and 12 parts 2-propanol. To this warm solution is added a warm solution of 2.6 parts oxalic acid dihydrate in 20 parts acetone. After cooling overnight at −20° C., the precipitated oxalate is filtered off, yielding the crude oxalate. This crop is recrystallized from a mixture of 80 parts 2-propanol and 32 parts acetone. The undissolved part is filtered off, yielding dl-1-[5-(4-fluoro-phenyl)-5-phenyl-pentyl]-4-(2-oxo-1-benzimidazolinyl)-piperidine oxalate, melting point 202–203.5° C.

*Example LXIX*

To a solution of 4-fluoro-phenyl-magnesium bromide, prepared in the usual manner from 24.3 parts magnesium and 192.5 parts 4-fluoro-bromobenzene in 400 parts anhydrous ether, is added dropwise a solution of 152 parts cyclopropyl-2-thienyl ketone in 400 parts anhydrous ether. After the addition is complete, the whole is stirred and refluxed for three hours. After cooling the reaction mixture is decomposed with 1700 parts ammonium chloride solution 20%. The organic layer is separated, washed once more with water, dried over sodium sulfate and evaporated. The oily residue is distilled in vacuo, yielding dl-cyclopropyl-4-fluorophenyl-2-thienyl-carbinol, boiling point 138–140° C., at 1 mm. pressure, $n_D^{20}$:1.5777, $d_{20}^{20}$:1.2296.

To a stirred solution of 120 parts dl-cyclopropyl-4-fluorophenyl-2-thienyl-carbinol in 2880 parts 1,4-dioxane are added 2160 parts perchloric acid in the course of 15 minutes (slightly exothermic reaction: temperature rises to about 30° C.). After the addition is complete, the whole is stirred for six hours at room temperature. Then there are added 2400 parts diisopropylether and the whole is neutralized with about 450 parts sodium hydrogen carbonate. The organic layer is separated, dried over magnesium sulfate and evaporated yielding 4-(4-fluoro-phenyl)-4-(2-thienyl)-but-3-en-1-ol, as an oily residue.

To a suspension of 11.4 parts lithium tetrahydroaluminate in 200 parts anhydrous benzene and 200 parts tetrahydrofurane is added dropwise a solution of 116 parts 4-(4-fluoro-phenyl)-4-(2-thienyl)-but-3-en-1-ol in 280 parts anhydrous benzene and 280 parts tetrahydrofurane. After the addition is complete, the whole is stirred and refluxed overnight. After cooling the reaction mixture is decomposed with 200 parts water and diluted sulfuric acid. The organic layer is separated, washed once more with 500 parts water, dried over magnesium sulfate and evaporated, to yield an oily residue which is distilled in vacuo, yielding dl-4-(4-fluoro-phenyl)-4-(2-thienyl)-butanol, boiling point 147–156° C. at 0.2–0.3 mm. pressure.

To a solution of 80 parts dl-4-(4-fluoro-phenyl)-4-(2-thienyl)-butanol in 200 parts anhydrous benzene are added portionwise 40 parts thionylchloride (slightly exothermic reaction: the temperature rises to 35° C.). After the addition is complete, the whole is stirred and refluxed for one and a half hours. After cooling, the reaction mixture is washed with a saturated solution of sodium hydrogen carbonate until neutral. The benzene layer is dried over magnesium sulfate and evaporated. The oily residue is distilled in vacuo, to yield dl-1-chloro-(4-fluoro-phenyl)-4-(2-thienyl)-butane, boiling point 140–142° C. at 0.4 mm. pressure, $n_D^{20}$: 1.5647.

To a stirred and refluxing mixture of 5.6 parts 4-(2-oxo-1-benzimidazolinyl)-piperidine hydrochloride, 9.3 parts sodium carbonate, a few crystals of potassium iodide in 136 parts 4-methyl-2-pentanone is added dropwise a solution of 7 parts dl-1-chloro-4-(4-fluoro-phenyl)-4-(2-thienyl)-butane in 24 parts 4-methyl-2-pentanone. After the addition is complete, the whole is further stirred and refluxed for forty-eight hours. After cooling the reaction mixture, 150 parts water are added. The organic layer is separated, dried over potassium carbonate and evaporated. The solid residue is recrystallized from 64 parts 4-methyl-2-pentanone. After cooling to 0° C., the formed solid is filtered off and dried, yielding dl-1-[4-(4 - fluoro - phenyl)-4-(2-thienyl)-butyl]-4-(2-oxo-1-benzimidazolinyl)-piperidine, melting point 185–188.5° C.

*Example LXX*

To a solution of 0.5 part 1-(3-cyano-3,3-di-phenyl-propyl) - 4 - (2-oxo-3-propionyl-1-benzimidazolinyl)-piperidine in 12 parts benzene is added a solution of 0.5 part picric acid in 8 parts benzene. After cooling to room temperature, the formed precipitate is filtered off, washed successively with benzene and ether and dried at 60° C. in vacuo, yielding 0.75 part product. This crop is boiled for thirty minutes in 160 parts methanol. The undissolved part is filtered off and after cooling the filtrate to room temperature, the formed solid is filtered off and dried in vacuo at 60° C., yielding 1-(3-cyano-3, 3-di-phenyl-propyl)-4-(2-oxo-3 - propionyl - 1 - benzimidazolinyl)-piperidine picrate, melting point 238–241.5° C.

What is claimed is:

1. A member selected from the group consisting of

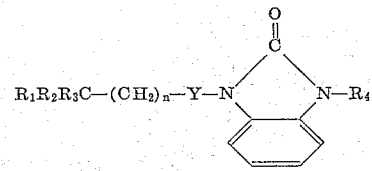

and the therapeutically active nontoxic acid addition salts thereof wherein $n$ is an integer from 2 to 5, $R_1$ is selected from the group consisting of hydrogen, hydroxy, cyano, carbamoyl and lower-alkyl-carbonyl, $R_2$ is aryl, $R_3$ is selected from the group consisting of aryl and arylmethylene, $R_4$ is selected from the group consisting of hydrogen, lower alkyl, lower-alkyl-carbonyl, lower-alkoxy-lower-alkyl, hydroxy-lower-alkyl, lower-alkoxy-carbonyl-lower-alkyl, lower-alkyl-carbonyl - lower - alkyl, cyano-lower-alkyl and halo-lower-alkyl, and Y is selected from the group consisting of

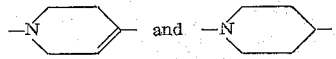

the nitrogen atom of which is attached to the

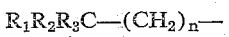

moiety; said lower alkyl and lower alkoxy having from 1 to 5 carbon atoms and said aryl being a member of the group consisting of phenyl, halophenyl, lower alkylphenyl, lower alkoxyphenyl, trifluoromethylphenyl and 2-thienyl.

2. 1-(3-cyano-3,3-diphenylpropyl)-4-(3-hydroxymethyl-2-oxo-1-benzimidazolinyl)-piperidine.

3. 1-(3-cyano-3,3-diphenylpropyl)-4-[3-(2-cyano-ethyl)-2-oxo-1-benzimidazolinyl]-piperidine hydrochloride hydrate.

4. 1-(3-cyano-3,3-diphenylpropyl)-4-[3-(ethoxymethyl)-2-oxo-1-benzimidazolinyl]-piperidine hydrochloride.

5. 1-(3-cyano-3,3-diphenylpropyl)-4-(3-methoxymethyl)-2-oxo-1-benzimidazolinyl)-piperidine hydrochloride.

6. 1 - (3 - cyano - 3,3-diphenylpropyl)-4-[3-(methoxymethyl)-2-oxo-1 - benzimidazolinyl] - 1,2,3,6 - tetrahydropyridine hydrochloride.

7. 1 - (3,3 - diphenylpropyl) - 4-(2-oxo-1-benzimidazolinyl)-piperidine hydrochloride.

8. 1-(3,3-diphenyl-3-hydroxypropyl)-4-(2-oxo-1 - benzimidazolinyl)-piperidine.

9. 4 - [3 - (2 - cyano-ethyl)-2-oxo-1-benzimidazolinyl]-1-(3,3-diphenyl-4-oxo-hexyl)-piperidine.

10. 1-(3,3-diphenyl-4-oxo-hexyl)-4-(2-oxo-1-benzimidazolinyl -piperidine.

11. 1-(3,3-diphenyl-4-oxo-pentyl)-4-(2-oxo-1-benzimidazolinyl)-1,2,3,6-tetrahydropyridine.

12. 1-(3,3-diphenylpropyl)-4-(3-hydroxymethyl-2-oxo-1-benzimidazolinyl)-piperidine hydrochloride.

13. 1-[4,4-di-(4-fluorophenyl)-butyl]-4-(2-oxo-1-benzimidazolinyl)-piperidine.

14. dl-1-[4-(4-fluorophenyl)-4-phenyl-butyl]-4-(2-oxo-1-benzimidazolinyl)-piperidine.

15. 1-(4,4-diphenyl-butyl)-4-(2-oxo-1-benzimidazolinyl)-piperidine.

16. 1-(3-cyano-3,3-diphenylpropyl)-4-(2-oxo-3-propionyl-1-benzimidazolinyl)-piperidine.

17. 1-(3,3-diphenyl-4-oxo-hexyl)-4-(3-acetyl-2-oxo-1-benzimidazolinyl)-piperidine.

18. 1-(3,3-diphenyl-4-oxo-hexyl)-4-(2-oxo-3-propionyl-1-benzimidazolinyl)-piperidine.

References Cited by the Examiner

UNITED STATES PATENTS 3,080,366  3/63  Janssen _____ 260—294

OTHER REFERENCES

Rossi et al., "Chemical Abstracts," vol. 55, pages 4526–27 (1961).

NICHOLAS S. RIZZO, *Primary Examiner.*

WALTER A. MODANCE, *Examiner.*

UNITED STATES PATENT OFFICE
CERTIFICATE OF CORRECTION

Patent No. 3,196,157                          July 20, 19(

Paul Adriaan Jan Janssen

It is hereby certified that error appears in the above numbered patent requiring correction and that the said Letters Patent should read as corrected below.

Column 7, lines 64 and 65, strike out "A mixture of 15.25 parts 1-benzyl-4-(2-oxo-1-benzimidazolinyl)-1,22,6-tetrahydropyridine, 2.4 parts so-" and insert instead -- A mixture of 19 parts 1-(3-cyano-3,3-diphenylpropyl)-4-(2-oxo-1-benzimidazoliny piperidine and 21.9 parts --; column 13, line 56, for "actone" read -- acetone --; column 15, line 29, for "1363.2-" read -- 136.2- --; column 23, lines 14 and 15, for "yieldin" read -- yielding --; line 52, for "edded portionwise 134 part" read -- added portionwise 134 parts --; column 27, lines 22 and 23, for "dl-1-chloro-(4-fluoro-phenyl)" read -- dl-1-chloro-4-(4-fluoro phenyl) --; column 28, lines 38 and 39, for "-benzimidazolinyl read -- -benzimidazolinyl)- --.

Signed and sealed this 15th day of February 1966.

(SEAL)
Attest:

ERNEST W. SWIDER                      EDWARD J. BRENNER
Attesting Officer                    Commissioner of Patents